(12) United States Patent
Swaminathan et al.

(10) Patent No.: US 10,860,858 B2
(45) Date of Patent: Dec. 8, 2020

(54) UTILIZING A TRAINED MULTI-MODAL COMBINATION MODEL FOR CONTENT AND TEXT-BASED EVALUATION AND DISTRIBUTION OF DIGITAL VIDEO CONTENT TO CLIENT DEVICES

(71) Applicant: Adobe Inc., San Jose, CA (US)

(72) Inventors: Viswanathan Swaminathan, Saratoga, CA (US); Saayan Mitra, San Jose, CA (US); Somdeb Sarkhel, Dallas, TX (US); Qi Lou, Irvine, CA (US)

(73) Assignee: ADOBE INC., San Jose, CA (US)

( * ) Notice: Subject to any disclaimer, the term of this patent is extended or adjusted under 35 U.S.C. 154(b) by 267 days.

(21) Appl. No.: 16/009,559

(22) Filed: Jun. 15, 2018

(65) Prior Publication Data

US 2019/0384981 A1      Dec. 19, 2019

(51) Int. Cl.
　　*G06K 9/00*　　(2006.01)
　　*G06K 9/62*　　(2006.01)

(52) U.S. Cl.
　　CPC ......... *G06K 9/00718* (2013.01); *G06K 9/628* (2013.01); *G06K 9/6256* (2013.01)

(58) Field of Classification Search
　　CPC .. G06K 9/00718; G06K 9/628; G06K 9/6256; G06K 9/6293
　　USPC ...................................................... 382/156
　　See application file for complete search history.

(56) References Cited

U.S. PATENT DOCUMENTS

| | | | |
|---|---|---|---|
| 2008/0172412 A1* | 7/2008 | Gruhl | G06Q 10/00 |
| 2016/0014482 A1* | 1/2016 | Chen | H04N 21/26258 |
| | | | 386/241 |
| 2016/0210532 A1* | 7/2016 | Soldevila | G06K 9/3258 |
| 2016/0328384 A1* | 11/2016 | Divakaran | G06F 40/169 |

FOREIGN PATENT DOCUMENTS

| | | | |
|---|---|---|---|
| CN | 102629275 A | * | 8/2012 |
| CN | 104506852 A | * | 4/2015 |
| CN | 106096664 A | * | 11/2016 |

OTHER PUBLICATIONS

Alijani, G.S., Mancuso, L.C., Kwun, O. and Omar, A. Effectiveness of online advertisement factors in recalling a product. Academy of Marketing Studies Journal, 14(1), p. 1. 2010.

(Continued)

*Primary Examiner* — Amandeep Saini
(74) *Attorney, Agent, or Firm* — Keller Jolley Preece

(57) ABSTRACT

The present disclosure relates to systems, methods, and computer readable media that utilize a trained multi-modal combination model for content and text-based evaluation and distribution of digital video content to client devices. For example, systems described herein include training and/or utilizing a combination of trained visual and text-based prediction models to determine predicted performance metrics for a digital video. The systems described herein can further utilize a multi-modal combination model to determine a combined performance metric that considers both visual and textual performance metrics of the digital video. The systems described herein can further select one or more digital videos for distribution to one or more client devices based on combined performance metrics associated with the digital videos.

20 Claims, 9 Drawing Sheets

(56) References Cited

OTHER PUBLICATIONS

Elisabetta Corvi and Michelle Bonera. "The effectiveness of advertising: a literature review." Xth Global Conference on Business and Economics. 2010.

Figueiredo, Flavio. "On the prediction of popularity of trends and hits for user generated videos." In Proceedings of the sixth ACM international conference on Web search and data mining. ACM, 2013.

Gürsun, Gonca, Mark Crovella, and Ibrahim Matta. "Describing and forecasting video access patterns." INFOCOM, 2011 Proceedings IEEE. IEEE, 2011.

Li, Haitao, Xiaoqiang Ma, Feng Wang, Jiangchuan Liu, and Ke Xu. "On popularity prediction of videos shared in online social networks." In Proceedings of the 22nd ACM international conference on Information & Knowledge Management, pp. 169-178. ACM, 2013.

Newman, Eric J., Donald E. Stem Jr, and David E. Sprott. "Banner advertisement and Web site congruity effects on consumer Web site perceptions." Industrial Management & Data Systems 104.3 (2004): 273-281.

Reading, N., Bellman, S., Varan, D., & Winzar, H. (2006). Effectiveness of telescopic advertisements delivered via personal video recorders. Journal of Advertising Research, 46(2), 217-227.

Ribeiro, M. T., Singh, S., & Guestrin, C. Why should i trust you?: Explaining the predictions of any classifier. In Proceedings of the 22nd ACM SIGKDD International Conference on Knowledge Discovery and Data Mining (pp. 1135-1144). ACM. 2016.

J.N. Sheth, "Measurement of Advertising Effectiveness: Some Theoretical Considerations", Journal of Advertising, vol. 3(1), 1974, pp. 6-11.

Szegedy, C., Vanhoucke, V., Ioffe, S., Shlens, J., & Wojna, Z. (2016). Rethinking the inception architecture for computer vision. In Proceedings of the IEEE Conference on Computer Vision and Pattern Recognition (pp. 2818-2826).

S. Ioffe and C. Szegedy. Batch normalization: Accelerating deep network training by reducing internal covariate shift. In Proceedings of the International Conference on Machine Learning (ICML), pp. 448-456, 2015.

S. Hochreiter and J. Schmidhuber. Long short-term memory. Neural Computing, 9(8), Nov. 1997.

Hussain, Z., Zhang, M., Zhang, X., Ye, K., Thomas, C., Agha, Z., Ong, N. and Kovashka, A., Jul. 2017. Automatic understanding of image and video advertisements. In 2017 IEEE Conference on Computer Vision and Pattern Recognition (CVPR) (pp. 1100-1110). IEEE.

\* cited by examiner

UTILIZING A TRAINED MULTI-MODAL COMBINATION MODEL FOR CONTENT AND TEXT-BASED EVALUATION AND DISTRIBUTION OF DIGITAL VIDEO CONTENT TO CLIENT DEVICES

BACKGROUND

Recent years have seen significant improvement in digital systems that provide digital content to client devices across computer networks. Indeed, it is now common for websites and other digital content distributors to provide digital videos to individual client devices or groups of client devices as part of targeted digital content campaigns implemented across computing networks via a variety of online platforms.

Furthermore, in an effort to identify digital content for distribution, conventional digital content distribution systems often perform online testing to determine efficacy of the digital video content. Conventional systems for evaluating and selecting digital content for presentation, however, suffer from a variety of problems in relation to accuracy, efficiency, and flexibility.

For example, conventional systems for identifying and selecting digital videos for dissemination are often inaccurate. Indeed, conventional systems often provide digital videos misaligned to individual client devices and corresponding users. For example, many conventional systems provide digital videos to client devices that do not view, click on, recall, or otherwise interact with the digital videos. As a result, digital content campaigns implemented by conventional systems often fail to accurately reach computing devices of a target audience that align with the digital content campaign.

In addition, conventional systems for analyzing effectiveness and selecting digital videos for distribution are often inefficient and expensive. As an initial matter, the inaccuracy of conventional systems often results in inefficient dissemination of digital content to client devices that have no need for, or interest in receiving, the disseminated digital content. This results in unnecessary, wasted utilization of resources from both disseminating computing systems and client computing systems. In addition, many conventional systems determine whether distributing a digital video will be effective by conducting a post-deployment analysis in which a digital video is provided to a test population and various metrics or interactions are tracked to determine efficacy. Conducting such online tests, however, often involves distributing (and tracking distribution) of digital content to thousands of client devices in addition to analyzing interactions with the distributed content to determine an effectiveness of distributing the particular digital media. These tests, thus, require significant computing resources in determining effectiveness of distributing digital videos to those client devices.

To avoid the drawbacks of online testing, some conventional systems utilize complex models to predict effectiveness of a digital content campaign. Training these models, however, is also often inefficient. For example, complex models often require expensive training processes that include collecting and analyzing massive quantities of training data while consuming significant time and computing resources. As a result, even avoiding expenses associated with online testing, conventional systems encounter significant costs, time, and computational constraints to identify or predict effectiveness of a digital content campaign.

Furthermore, conventional digital content distribution systems are often inflexible and rigid. For example, conventional systems that utilize online testing are limited to user interactions after distribution of digital content. Moreover, complex models or algorithms generally analyze a limited set of features extracted from visual content in digital videos. The inaccuracies and inefficiencies discussed above often result from the rigidity of such systems.

These and other problems exist with regard to identifying digital content for distribution.

SUMMARY

Embodiments of the present disclosure provide benefits and/or solve one or more of the foregoing and other problems in the art with systems, methods, and non-transitory computer readable media that utilize a trained multi-modal combination model for content and text-based evaluation and distribution of digital video content to client devices. In particular, in one or more embodiments, the disclosed systems evaluate visual content of a digital video, text associated with the digital video, and historical data to efficiently and accurately predict digital video performance before the digital video is disseminated to client devices. To illustrate, the disclosed systems can utilize a visual prediction model to generate predicted visual performance metrics (e.g., based on visual features from frames of the digital video) in parallel with a text prediction model that generates predicted textual performance metrics (e.g., based on text or metadata associated with a digital video). The disclosed systems can then apply a trained multi-modal combination model to the predicted visual and textual performance metrics to generate combined performance metrics for a set of digital videos. Based on the combined performance metrics, the disclosed systems can select a subset of digital videos for dissemination to one or more client devices. In this manner, the disclosed systems can improve accuracy (e.g., by utilizing visual, textual, and combination machine learning models trained with historical data), increase efficiency (e.g., reduce time and computing resources and the need for online testing), and enhance flexibility (e.g., by utilizing a flexible architecture based on a variety of textual and visual features).

Additional features and advantages will be set forth in the description which follows, and in part will be obvious from the description, or may be learned by the practice of such exemplary embodiments.

BRIEF DESCRIPTION OF THE DRAWINGS

Various embodiments will be described and explained with additional specificity and detail through the use of the accompanying drawings in which.

DETAILED DESCRIPTION

Figure 1:
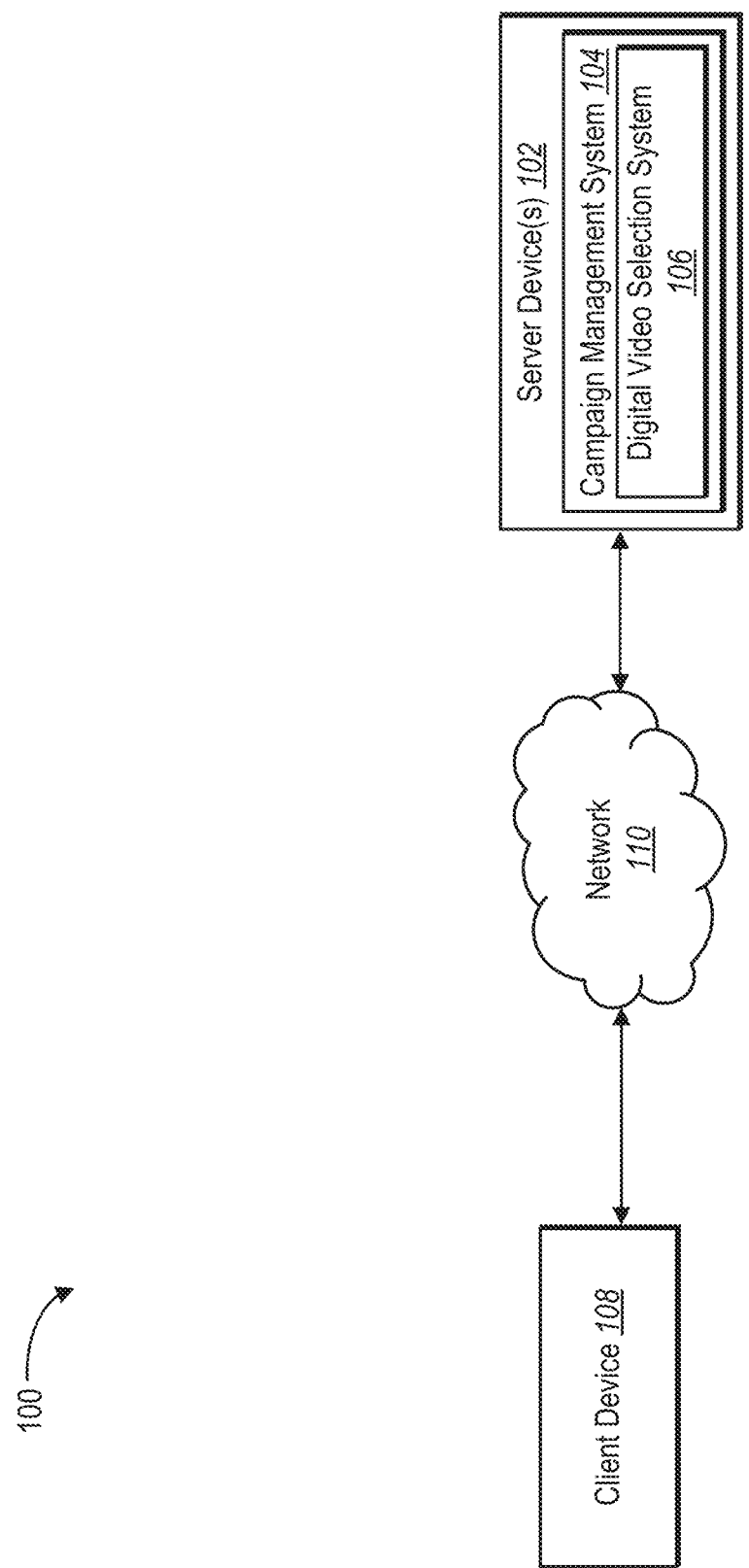
FIG. 1 illustrates a block diagram of an environment in which a digital video selection system is implemented in accordance with one or more embodiments.

One or more embodiments of the present disclosure include a digital video selection system that utilizes a deep neural network comprising a visual prediction model, a text prediction model, and a multi-modal combination model to select digital video content for client devices. In particular, the digital video selection system can utilize independently trained visual and text prediction models to determine visual and textual performance metrics for a digital video. The digital video selection system can further utilize a multi-modal combination model trained to determine a combined performance metric that considers both visual and textual performance metrics of the digital video. Based on these combined performance metrics, the digital video selection system can further select a set of digital videos for dissemination to one or more client devices. In this manner, the digital video selection system, can accurately, efficiently, and flexibly identify, evaluate, and disseminate digital video content to a variety of client devices.

To illustrate, in one or more embodiments, the digital video selection system can generate a visual feature representation of a digital video and utilize a neural network trained to determine predicted visual performance metrics based on the visual feature representation of the digital video. In addition, the digital video selection system can generate a textual feature representation of the digital video (e.g., text corresponding to the digital video) and utilize a text prediction model trained to determine predicted textual performance metrics based on the textual feature representation of the digital video. Moreover, the digital video selection system can further generate a combined performance metric by weighting the predicted visual performance metric and the predicted textual performance metric according to a multi-modal combination model trained based on a set of training digital videos, training performance data, training textual performance metrics, and training visual performance metrics. Furthermore, the digital video selection system can determine one or more digital videos to distribute to client devices based on the combined performance metric for the digital video.

As just mentioned, the digital video selection system can utilize a visual prediction model including a neural network trained to generate a predicted visual performance metric of a digital video. For example, the digital video selection system can extract visual features from the digital video to generate a visual feature representation (e.g., a multi-dimensional feature vector) representative of the visual features of the digital video. The digital video selection system can further apply a bidirectional long short term memory (LSTM) network to the visual feature representation to generate a predicted visual performance metric representative of a predicted performance of the digital video based on the visual features of the digital video.

The digital video selection system can further utilize a text prediction model trained to generate a predicted textual performance metric of the digital video. For example, the digital video selection system can identify text associated with the digital video (e.g., topics, keywords, etc.) to generate a textual representation of the digital video. The digital video selection system can further apply a text predictor (e.g., a multi-class classifier trained using the Naïve Bayes model) to the textual representation of the digital video to generate a predicted textual performance metric representative of a predicted performance of the digital video based on the identified text associated with the digital video.

As will be described in further detail below, the text prediction model and the visual prediction model may be trained in parallel with each other. For example, in one or more embodiments, the visual prediction model is trained to predict a visual performance metric based on visual content from a set of training digital videos in addition to training performance data associated with the set of training digital videos. Similarly, in one or more embodiments, the text prediction model can be trained to predict a textual performance metric based on text associated with a set of training videos and associated training performance data. In one or more embodiments, the digital video selection system can efficiently train the visual prediction model in parallel and independent from the text prediction model based on the same training performance data from a common set of training digital videos.

The digital video selection system can additionally utilize a multi-modal combination model to generate a combined performance metric for the digital video based on the predicted visual performance metric determined by the visual prediction model and the predicted textual performance metric determined by the text prediction model. For example, the digital video selection system can utilize a trained multi-modal combination model to perform a combination of a first predicted performance metric determined by the visual prediction model and a second predicted performance metric determined by the text prediction model to output a combined performance metric based on both the outputs of the visual prediction model and the text prediction model. In one or more embodiments, the digital video selection system utilizes the multi-modal combination model to determine the combined performance metric by learning weights and applying the learned weights to the respective predicted visual performance metric and predicted textual performance metric.

Furthermore, the digital video selection system can evaluate and select one or more digital videos for distribution based on combined performance metrics associated with a plurality of digital videos. For example, the digital video selection system may identify a subset of digital videos for distribution by identifying digital videos having combined performance metrics that exceed a threshold value. Similarly, the digital video selection system can compare combined performance metrics between digital videos (e.g., the top two digital videos) to select digital videos for dissemination. In this manner, the digital video selection system can efficiently and accurately evaluate digital videos prior to deployment of a digital content campaign.

The digital video selection system provides a number of advantages over conventional systems. For example, by utilizing a visual prediction model, text prediction model, and multi-modal combination model, the digital video selection system can more accurately predict an outcome of distributing a digital video to client devices. In particular, the digital video selection system can more accurately determine a predicted performance of deploying a digital video by utilizing the visual prediction model uniquely trained to determine a visual performance metric in combination with a text prediction model uniquely trained to determine a textual performance metric. By considering both text and visual characteristics and further utilizing a multi-modal combination model trained to accurately consider multiple performance metrics, the digital video selection system can more accurately determine a predicted performance associated with deploying a digital video.

In addition, by applying the trained prediction models to a digital video and determining a combined performance metric prior to deployment of the digital video, the digital video selection system can significantly reduce consumption of bandwidth and processing resources, thereby improving operation of an associated computing system. In particular, by accurately determining a combined performance metric prior to deployment, the digital video selection system can avoid financial and computational expenses associated with performing online testing and tracking actions of users of a test population in response to receiving the digital video. Moreover, the digital video selection system can avoid distributing a digital video associated to a test population whose interests fail to align with the digital video.

Furthermore, by training and/or utilizing the visual prediction model and the text prediction model (e.g., in parallel), the digital video selection system can accurately determine a predicted performance for a digital video more efficiently than conventional systems. For example, in one or more embodiments, the digital video selection system trains a lightweight visual prediction model and a lightweight text prediction model (e.g., Naïve Bayes model) and then combines results from these independent efficient models utilizing a combination model. In this manner, the digital video selection system can train the discrete prediction models using fewer training digital videos and associated training performance data. Indeed, in some embodiments, by training the visual prediction model and text prediction model in parallel, the digital video selection system can train the overarching neural network in more efficiently. In particular, the digital video selection system can use less time and fewer training resources (e.g., utilizing less than 500 training samples in some embodiments), thereby consuming less processing power to determine predicted performance relative to some conventional training approaches.

In addition, the digital video selection system can improve flexibility relative to conventional systems. As an initial matter, the digital video selection system improves flexibility relative to conventional systems that utilize online testing by allowing for accurate determination of digital content campaign efficacy prior to execution of the digital content campaign and dissemination of digital videos to client devices. In addition, as described, the digital video selection system can flexibly analyze a wide variety of different features related to digital videos, including visual features corresponding to visual content as well as textual features corresponding to text corresponding to the digital video. As outlined below, in one or more embodiments, the digital video selection system can consider other features (and other corresponding prediction models), such as audio features, or activity features, making the digital video selection system more robust than other conventional systems.

As illustrated by the foregoing discussion, the present disclosure utilizes a variety of terms to describe features and advantages of the digital video selection system. Additional detail is now provided regarding the meaning of such terms. For instance, as used herein, a "digital video" refers to digital data representative of a sequence of visual images. By way of example, a digital video may refer to a digital file having one of the following file extensions: AVI, FLV, WMV, MOV, MP4. Thus, a digital video includes digital data or a digital file for a video that is displayable via a graphical user interface of a display of a computing device. A digital video may have a corresponding frame rate, resolution, or duration. In addition, a digital video may include data or information about the digital video file (e.g., metadata). Moreover, in addition to visual content, a digital video may include additional types of content (e.g., audio content) that a viewer experiences when viewing a presentation of the digital video.

As used herein, a "visual prediction model" refers to a computer algorithm or model (e.g., classification model or regression model) that generates a predicted visual performance metric. In particular, a visual prediction model includes a neural network or other machine learning architecture trained to identify and analyze visual features of a digital video to predict performance of the digital video upon dissemination to a client device. For example, a visual prediction model can include a convolutional neural network that generates a feature vector for frames of a digital image and a recurrent neural network that includes bi-directional long short term neural network layer that analyzes the feature vector (based on the sequence of the frames of the digital video) to generate a predicted visual performance metric. Additional detail regarding exemplary architecture of a visual prediction model is provided below (e.g., in relation to FIGS. 2, 3).

As used herein, a "neural network" refers to a machine learning model that can be tuned (e.g., trained) based on training input to approximate unknown functions. In particular, the term "neural network" can include a model of interconnected digital neurons that communicate and learn to approximate complex functions and generate outputs based on a plurality of inputs provided to the model. For instance, the term "neural network" includes one or more machine learning algorithms. In particular, the term "neural network" includes deep convolutional neural networks (i.e., "CNNs") and fully convolutional neural networks (i.e., "FCNs"). In other words, a neural network is an algorithm that implements deep learning techniques, i.e., machine learning that utilizes a set of algorithms to attempt to model high-level abstractions in data. In one or more embodiments described herein, the neural network of the visual prediction model refers to a machine learning model trained to generate a predicted visual performance metric for a digital video based on identified visual features of the digital video.

As used herein, a "text prediction model" refers to a computer algorithm or model (e.g., classification model or regression model) that generates a predicted textual performance metric. In particular, a textual prediction model includes a machine learning model (e.g., neural network, supervised learning classifier, decision tree, Naïve Bayes classifier, or other machine learning architecture) trained to identify and analyze textual features of a digital video to predict performance of the digital video upon dissemination to a client device. For example, in one or more embodiments, the text prediction model includes a textual feature extractor that maps text associated with a digital video to a text vector and a multi-class classifier (e.g., a Naïve Bayes classifier) trained to determine a predicted visual performance metric based on identified text vector. Additional detail regarding exemplary architecture of a text prediction model is proved below (e.g., in relation to FIGS. 2, 3).

As will be described in further detail below, the digital video selection system can generate a number of different metrics associated with information extracted from a digital video including, for example, a predicted visual performance metric, a predicted textual performance metric, and a combined performance metric. As used herein, a "predicted visual performance metric" refers to a score, value, or distribution (e.g., probability distribution), based on visual features of a digital video, reflecting a predicted action, occurrence, or event upon distributing the digital video to one or more client devices. For example, a predicted visual performance metric includes a predicted score or probability distribution that a client device will play the entire digital video based on visual features of the digital video. Similarly, predicted visual performance metrics can include a score or probability distribution reflecting a predicted impression of the digital video on viewers and/or a predicted rate of conversion by one or more users for a product associated with the digital video.

As used herein, a "conversion" refers to a monitored act, event, or behavior of a user/client device. In particular, the term conversion includes an act, event, or behavior monitored (and desired) by a publisher (or administrator). For example, a conversion may include, but is not limited to, a click, a page land, a purchase, a subscription (e.g., signing up for a trial subscription of digital content), video view, and so forth.

Similarly, as used herein, a "predicted textual performance metric" refers to a score, value, or distribution (e.g., probability distribution), based on text corresponding to a digital video, reflecting a predicted action, occurrence, or event upon distributing the digital video to one or more client devices. Thus, a predicted visual performance metric includes a predicted score or probability distribution that a client device will play the entire digital video based on textual features corresponding to the digital video.

As used herein, a "multi-modal combination model" refers to a computer algorithm (mixture model or other probabilistic model) trained to determine a combined performance metric. In particular, a multi-modal combination model includes a computer algorithm trained to analyze multiple predicted performance metrics associated with a predicted performance of distributing a digital video (e.g., visual performance metrics and textual performance metrics) and generate a combined performance metric. For example, in one or more embodiments, a multi-modal combination model refers to a probabilistic model trained to combine two or more distributions of predicted performance values or classifications. For instance, in one or more embodiments, the digital video selection system trains the multi-modal combination model by learning weights (based on historical data) to apply to predicted performance metrics to generate a combined performance metric. Accordingly, as used herein, a "combined performance metric" (or a "combined visual-text performance metric") refers to a score, value, or distribution (e.g., probability distribution), based on text corresponding to a digital video and visual features corresponding to the digital video, reflecting a predicted action, occurrence, or event upon distributing the digital video to one or more client devices.

As will be described in further detail below, the visual prediction model, text prediction model, and multi-modal combination model are trained based on training performance data associated with a set of training digital videos. As used herein, "training performance data" refers to historical data associated with actions of training users with respect training digital videos previously distributed to client devices of the training users. For example, training performance data can include identified clicks and other interactions by viewers of respective training digital videos, positive or negative impressions by viewers, and tracked conversion rates associated with one or more actions taken by viewers of the training digital videos.

Additional detail will now be provided regarding the digital video selection system in relation to illustrative figures portraying example embodiments. For example, FIG. 1 illustrates an example environment 100 for analyzing and identifying one or more digital videos for distribution in accordance with one or more embodiments described herein. As shown in FIG. 1, the environment 100 includes a server device(s) 102 including a campaign management system 104 and a digital video selection system 106. The environment 100 further includes a client device 108 in communication with the server device(s) 102 over a network 110.

As shown in FIG. 1, the server device(s) 102 and the client device 108 can communicate with each other directly or indirectly through the network 110. The network 110 may include one or multiple networks and may use one or more communication platforms or technologies suitable for transmitting data. In one or more embodiments, the network 110 includes the Internet or World Wide Web. In addition, or as an alternative, the network 110 can include other types of communication networks as described below (e.g., in relation to FIG. 9).

Moreover, the client device 108 may refer to various types of computing devices. For example, the client device 108 may include a mobile device such as a mobile telephone, a smartphone, a PDA, a tablet, or a laptop. Additionally, or alternatively, the client device 108 may include a non-mobile device such as a desktop computer or television. In addition, as mentioned above, the environment 100 includes the server device(s) 102. The server device(s) 102 can generate, store, receive, and/or transmit any type of data, including one or more selected digital videos to the client device 108. In one or more embodiments, the server device(s) 102 comprises a data server. The server device(s) 102 can also comprise communication servers or web-hosting servers. Additional detail regarding client devices and server devices is provided below (e.g., in relation to FIG. 9).

As mentioned above, and as shown in FIG. 1, the server device(s) 102 can include the campaign management system 104 and digital video selection system 106. The campaign management system 104 can manage, operate, run, and/or execute a digital content campaign. For example, the digital campaign management system 104 can receive digital content from a publisher or advertiser (e.g., publisher of online, television, or print media), receive or generate campaign parameters (e.g., a budget, campaign duration, or content selection policies), and then provide the digital content to client devices in accordance with the campaign parameters. Indeed, in one or more embodiments, the digital campaign management system 104 utilizes the digital video selection system 106 to identify digital content to provide as part of a digital content campaign (e.g., what digital videos to provide to particular client devices or groups of client devices based on predicted performance of the digital videos). For instance, the campaign management system 104 can detect, in real-time, the client device 108 navigating to a digital asset (e.g., a website) with a corresponding impression opportunity (e.g., with an advertising time slot). While the client device 108 navigates to and loads the digital asset, the campaign management system (utilizing digital videos identified or selected by the digital video selection system 106 in accordance with one or more embodiments described herein) can select/provide one or more digital videos to the client device 108 based on corresponding combined performance metrics (all within a matter of milliseconds).

As shown in FIG. 1, the campaign management system 104 and digital video selection system 106 are implemented on the server device(s) 102. Nevertheless, in one or more embodiments, the campaign management system 104 and/or the digital video selection system 106 are implemented in whole (or in part) on the client device 108. As an example, in one or more embodiments, the client device 108 receives one or more digital videos from a web server and utilizes the digital video selection system 106 implemented thereon to generate or otherwise determine a combined performance metric for the one or more digital videos and select one or more digital videos for presentation via a graphical user interface of the client device 108.

By way of example, the server device(s) 102 can receive, access, or otherwise identify a digital video. The digital video selection system 106 can further identify characteristics of the digital video including visual features, text, or other characteristics of the digital video. In identifying characteristics of the digital video, the digital video selection system 106 can utilize a number of prediction models in combination with a multi-modal combination model to generate or otherwise determine a combined performance metric associated with a predicted performance of distributing the digital video to one or more client devices (e.g., the client device 108).

In particular, the digital video selection system 106 can utilize a trained visual prediction model to determine a predicted visual performance metric based on identified visual features of the digital video. The digital video selection system 106 can further utilize a trained text prediction model to determine a predicted textual performance metric based on identified text associated with the digital video. Moreover, the digital video selection system 106 can utilize a trained multi-modal combination model to determine the combined performance metric based on the predicted visual performance metric and the predicted textual performance metric.

In one or more embodiments, the digital video selection system 106 implemented on the server device(s) 102 trains one or more of the visual prediction model, text prediction model, and multi-modal combination model. In particular, the digital video selection system 106 can train the various models based on training data including visual content of training videos, text associated with the training videos, and training performance data associated with the respective training videos. Alternatively, in one or more embodiments, the server device(s) 102 receives one or more of the visual prediction model, text prediction model, and multi-modal combination model.

Upon determining the combined performance metric, the digital video selection system 106 can further determine whether to send the digital video via a distribution channel (e.g., a social media feed, email campaign, a website, streaming, or broadcast television) or to a particular target audience (e.g., an audience including the client device 108) based on the combined performance metric. For example, in one or more embodiments, the digital video selection system 106 identifies a set of digital videos for dissemination to a target audience including (or excluding) the digital video based on the combined performance metric for the digital video. In one or more embodiments, the digital video selection system 106 generates or otherwise determines a combined performance metric for any number of digital videos and selects one or more of the digital videos having a combined performance metric compatible with a target audience or distribution channel.

Figure 2:
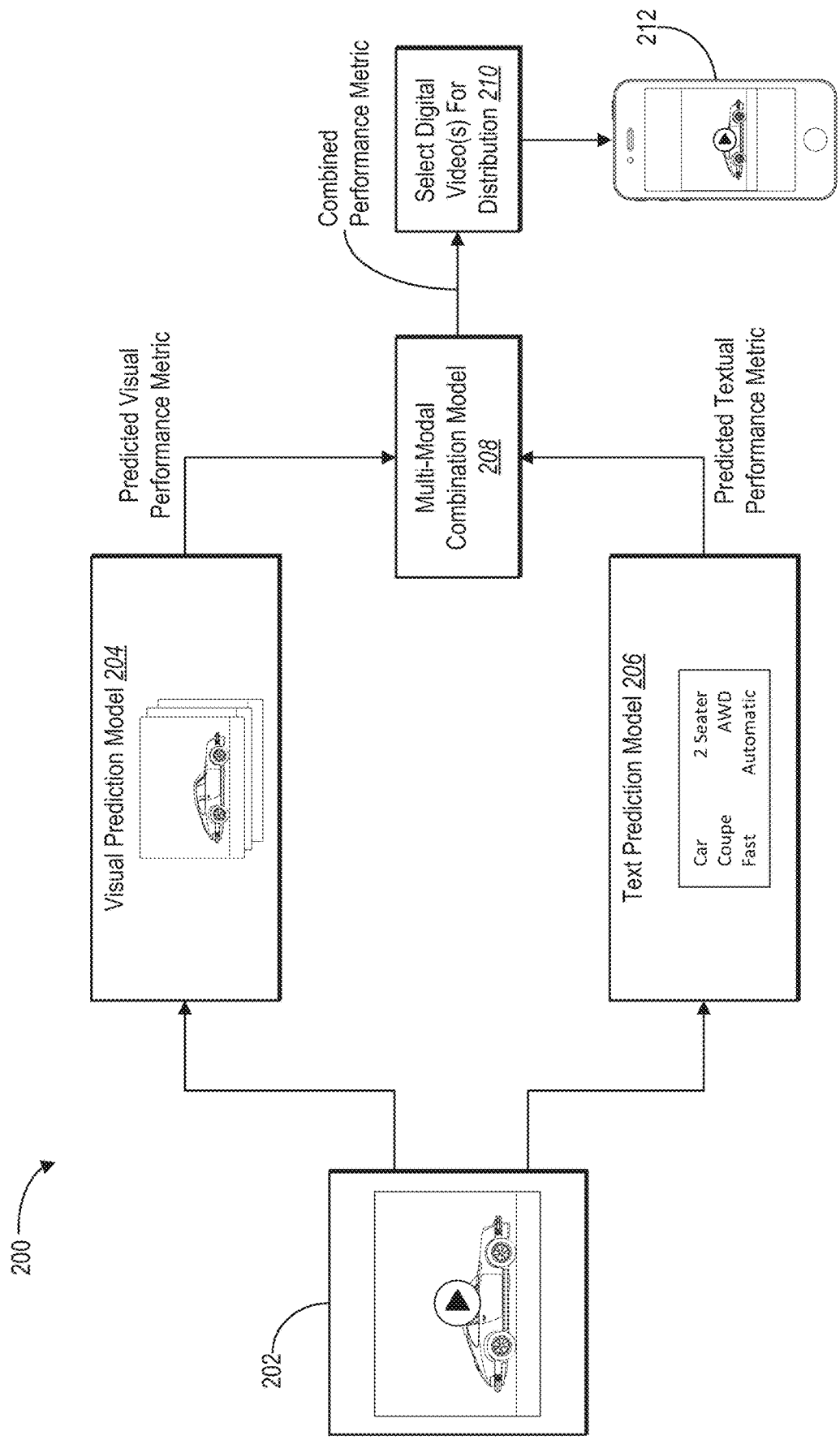
FIG. 2 illustrates utilizing an example architecture for determining a combined visual-textual performance metric and identifying a digital video for dissemination in accordance with one or more embodiments.

FIG. 2 illustrates an example framework for generating a combined performance metric and evaluating one or more digital videos in accordance with one or more embodiments. In particular, FIG. 2 illustrates an example deep neural network digital video prediction model 200 (hereinafter, "prediction model 200") including a visual prediction model 204, text prediction model 206, and multi-modal combination model 208 that the digital video selection system 106 utilizes to cooperatively generate a combined performance metric for a digital video 202 representative of a predicted response to providing the digital video 202 to one or more client devices.

In one or more embodiments, the digital video 202 refers to a digital video for which no historical data is available. Accordingly, the visual prediction model 204, text prediction model 206, and multi-modal combination model 208 can cooperatively determine a combined performance metric for the digital video 202 prior to deployment of the digital video 202 to one or more client devices and without any historical data associated with deploying the digital video 202.

As shown in FIG. 2, the digital video selection system 106 can utilize the visual prediction model 204 to determine a predicted visual performance metric based on identified visual characteristics of the digital video 202. For example, the digital video selection system 106 can apply the visual prediction model 204 to the digital video 202 to analyze the digital video 202 (e.g., analyze discrete video frames of the digital video 202) and identify a number of visual characteristics of the digital video 202. The digital video selection system 106 can further utilize a neural network of the visual prediction model 204 to generate a predicted visual performance metric based on the visual characteristics of the digital video 202. For example, the digital video selection system 106 can generate a distribution of scores (e.g., a first distribution of scores) based on the visual characteristics of the digital video 202 representative of predicted responses to providing the digital video to one or more client devices.

As further shown in FIG. 2, the digital video selection system 106 can utilize the text prediction model 206 trained to determine a predicted textual performance metric based on identified text corresponding to the digital video 202. In particular, and as will be described in further detail below, the digital video selection system 106 can utilize the text prediction model 206 to extract or otherwise identify text associated with the digital video. For example, the digital video selection system 106 can identify text from metadata of the digital video and/or otherwise extract text from the digital video 202 using one or more auto-tagging tools. In addition, the digital video selection system 106 can determine a predicted textual performance metric based on the identified text associated with the digital video 202. For example, the digital video selection system 106 can generate a distribution of scores (e.g., a second distribution of scores) based on the text associated with the digital video 202 representative of predicted responses to providing the digital video to one or more client devices.

Moreover, the digital video selection system 106 can train and/or utilize the multi-modal combination model 208 to generate a combined performance metric based on outputs of the visual prediction model 204 and text prediction model 206. In particular, the digital video selection system 106 can modify values of the predicted visual performance metric and the predicted textual performance metric in accordance with weights for the respective visual prediction model 204 and text prediction model 206 learned from the training performance data. For example, the digital video selection system 106 can apply a first weight to the predicted visual performance metric and a second weight to the predicted textual performance metric to determine a weighted combination of the predicted visual performance metric and the predicted textual performance metric (e.g., the combined performance metric). In one or more embodiments, the combined performance metric includes a combined distribution of scores representative of predicted responses to providing the digital video to one or more client devices.

In one or more embodiments, each of the predicted performance metrics include probability distributions of performance scores. Accordingly, as will be described in further detail below, the digital video selection system 106 can generate the combined performance metric by combining the distributions associated with each of the predicted visual performance metric and the predicted textual performance metric. For example, the digital video selection system 106 can generate the combined performance metric by combining the probability distributions output by each of the visual prediction model 204 and the text prediction model 206. In addition, and as will be described in further detail below in connection with FIG. 5, the digital video selection system 106 can learn the weights and mixture components for combining the predicted performance metrics in a variety of ways.

While FIG. 2 illustrates a framework in which the digital video selection system 106 utilizes a visual prediction model 204 and text prediction model 206 to analyze and determine predicted performance metrics based on two different characteristics of the digital video 202, the digital video selection system 106 can utilize one or more additional prediction models. For example, while not shown in FIG. 2, the digital video selection system 106 can utilize an audio prediction model trained to analyze audio characteristics of the digital video 202 and generate a predicted audio performance metric based on identified audio features of the digital video 202.

Moreover, in accordance with one or more embodiments described above, the multi-modal combination model 208 can similarly generate a combined performance metric based on any number of predicted performance metrics from corresponding models. Therefore, while one or more embodiments described herein relate specifically to a framework in which the digital video selection system 106 trains and/or utilizes a visual prediction model 204 and text prediction model 206 in combination with a multi-modal combination model 208 to generate a combined performance metric, similar features and functionality described in connection with the example framework illustrated in FIG. 2 can apply to utilizing one or more additional prediction models for analyzing and classifying various features and characteristics of digital videos.

Upon generating or otherwise determining the combined performance metric for the digital video 202, the digital video selection system 106 can further perform an act 210 of selecting one or more digital videos for distribution to a client device 212 (e.g., similar to the client device 108 of FIG. 1) based on the combined performance metric. For example, the digital video selection system 106 can utilize the multi-modal combination model 208 in combination with the visual prediction model 204 and the text prediction model 206 to determine a combined performance metric for each of a plurality of digital videos. The digital video selection system 106 can further identify a subset of the plurality of digital videos for distribution to one or more client devices (e.g., the client device 212) based on combined performance metrics corresponding to the plurality of digital videos. For example, the digital video selection system 106 can identify the subset of digital videos for distribution based on the combined performance metrics for the subset of digital videos exceeding a threshold value. As another example, the digital video selection system 106 can identify the subset of digital videos for distribution by identifying a number of digital videos associated with a higher combined performance metric than other digital videos from the plurality of digital videos.

In one or more embodiments, the digital video selection system 106 selects the digital video(s) for transmission by delivering one or more digital videos over a network (e.g., the network 110). As another example, the digital video selection system 106 may provide an indication of the combined performance metric to a web server, ad server, publishing server, or other computing device that determines when and how to provide one or more digital videos to the client device 212.

Figure 3:
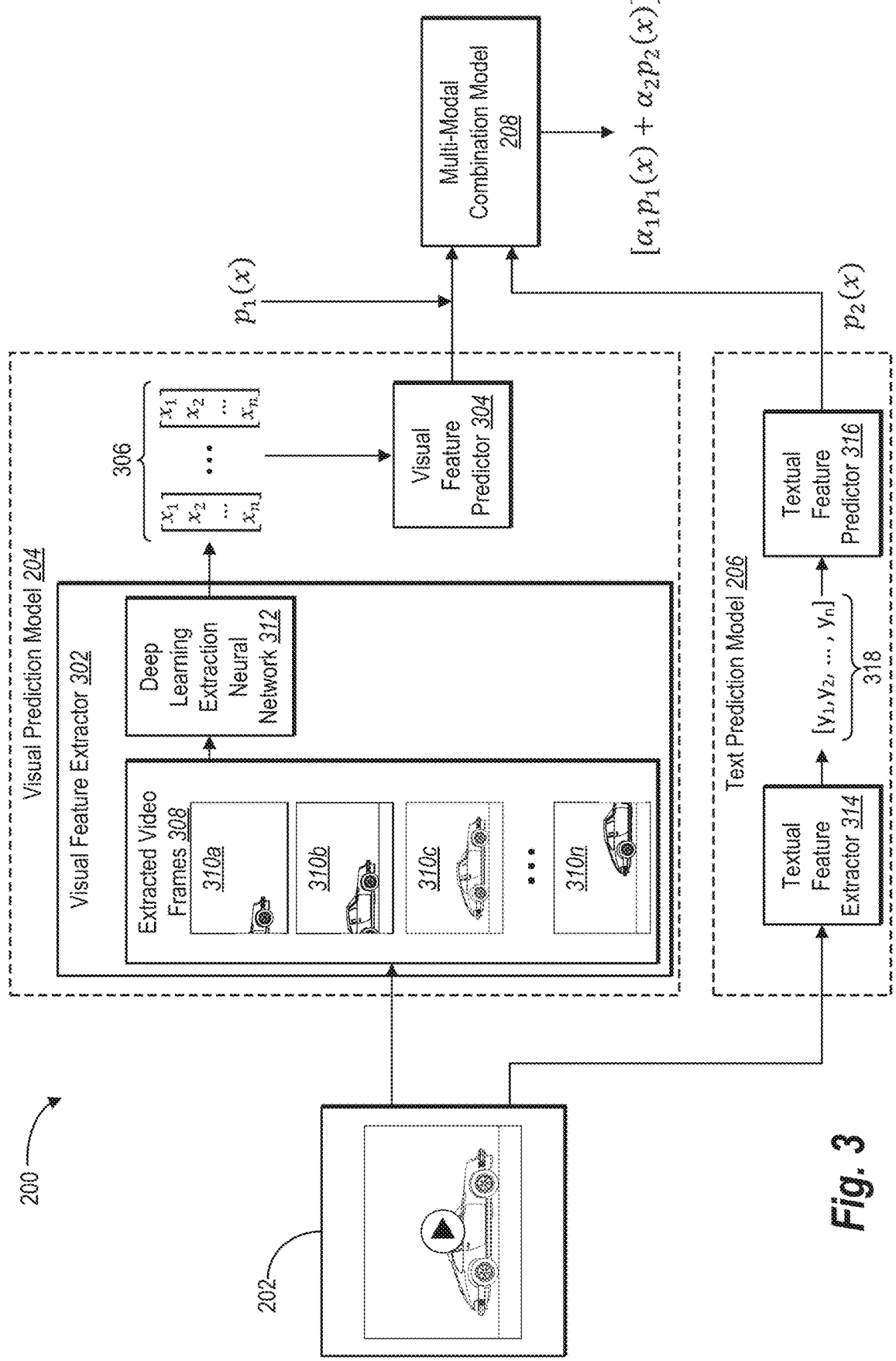
FIG. 3 illustrates an example architecture for determining a combined visual-textual performance metric in accordance with one or more embodiments.

FIG. 3 illustrates an additional example architecture of the prediction model 200 for generating a combined performance metric based on a combination of visual and textual features associated with the digital video 202. Indeed, in relation to the embodiment of FIG. 3, the prediction model 200 includes the visual prediction model 204, the text prediction model 206, and the multi-modal combination model 208 that include similar features and functionality described above in connection with FIG. 2.

As further shown in FIG. 3, the visual prediction model 204 includes a visual feature extractor 302 and a visual feature predictor 304 (e.g., a visual feature classifier). In particular, the digital video selection system 106 can utilize the visual feature extractor 302 to generate a visual feature representation (i.e., the feature vector 306) of the digital video. The digital video selection system 106 analyzes the feature vector 306 utilizing the visual feature predictor 304 to generate a predicted visual performance metric, $p_1(x)$.

To illustrate, in relation to FIG. 3, the digital video selection system 106 extracts a plurality of video frames 310a-n from the digital video 202. In particular, the digital video selection system 106 extracts a predefined number of the video frames 310a-n. For example, in one or more embodiments, the digital video selection system 106 extracts k equally spaced representative frames from the digital video 202.

As further shown in FIG. 3, the visual feature extractor 302 includes a deep learning extraction neural network 312 trained to generate the visual feature vector 306 (or other visual feature representation) from the video frames 310a-n. In particular, the deep learning extraction neural network 312 is a convolutional neural network (or other deep learning model) trained to identify visual features from a number of video frames. Thus, in one or more embodiments, the digital video selection system 106 applies a convolutional neural network (e.g., an Inception V3 deep learning network) including convolutional layers, pooling layers, concatenation layers, dropout layers, fully connected layers, and softmax layers trained to identify visual features and generate a visual feature vector representative of the identified visual features.

The digital video selection system 106 can utilize the visual feature extractor 302 to generate feature vectors for a digital video (e.g., individual frames of a digital video). For example, the digital video selection system 106 can extract a feature vector from an internal layer of the convolutional neural network (prior to a classification layer) and utilize the feature vector as a representation of the digital video (e.g., individual frames of the digital video).

To illustrate, in one or more embodiments, the digital video selection system 106 generates the visual feature vector 306 by passing the video frames through the deep learning extraction neural network 312. Moreover, the digital video selection system 106 identifies the feature vector 306 from the last hidden layer of the deep learning extraction neural network 312. In particular, the digital video selection system 106 can fetch a rectifier linear unit (ReLu) activation of the last hidden layer (e.g., the layer prior to a classification layer of the deep learning extraction network 312). By passing the video frames through the deep learning extraction network 312 in this way, the digital video selection system 106 can generate a dimensional feature vector (e.g., a 2048-dimensional vector) representative of the digital video.

In one or more embodiments, the visual feature vector 306 reflects latent features generated by a neural network (e.g., the convolution neural network) at different levels of abstraction, and therefore, is not capable of being interpreted, analyzed, or understood by a human. Moreover, in one or more embodiments, the digital video selection system 106 generates the visual feature vector 306 having the same length and number of values regardless of a duration of the digital video 202.

Upon generating the visual feature representation (e.g., the visual feature vector 303), the digital video selection system 106 can utilize the visual feature predictor 304 to generate a predicted visual performance metric, $p_1(x)$, based on the value(s) of the visual feature representation. For example, the visual feature predictor 304 can include a neural network (deep learning model) trained to analyze a visual feature vector or other data structure representative of the digital video 202 to determine a predicted visual performance metric representative of predicted responses of viewers upon viewing the digital video 202.

As just mentioned, in one or more embodiments, the visual feature predictor 304 includes a deep learning network. For example, in one or more embodiments, the visual feature predictor 304 includes a recurrent neural network. Specifically, the visual feature predictor 304 can utilize a bidirectional long short term memory (LSTM) network with a softmax output layer trained to generate the predicted visual performance metric based on values of the visual feature representation.

Indeed, the digital video selection system 106 can utilize an LSTM architecture to account for sequential data (e.g., sequential frames) in analyzing input (e.g., an input digital video). To illustrate, the LSTM network can include a number of blocks (sometimes referred to as "context units" or simply "units") that each analzye a different frame of an input digital video while preserving its sequential order. Each block generates an output vector as well as a latent vector that the digital video selection system 106 passes to an adjacent block that corresponds to a next video frame in the sequence. Thus, by utilizing the LSTM architecture in a recurrent neural network, the digital video selection system 106 considers temporal dependency between frames. Accordingly, the output of each block is based not only on its respective input frame, but also on the latent vectors received from adjacent blocks. Additionally, in embodiments where the digital video selection system 106 utilizes a bidirectional LSTM, the digital video selection system 106 passes latent vectors between LSTM blocks in both directions in the context of the sequence of video frames.

As mentioned above, the digital video selection system 106 can train and apply the visual feature predictor 304. For example, the digital video selection system 106 can train an LSTM network to generate a predicted visual performance metric utilizing training performance data and training digital videos. In particular, the digital video selection system 106 can train the visual feature predictor 304 to classify training digital videos within performance categories (e.g., category 1, 2, 3, 4, or 5 performance) based on training performance data. Additional detail regarding training the visual feature predictor 304 is provided below in relation to FIG. 4

As illustrated in FIG. 3, the digital video selection system 106 can apply the visual feature predictor 304 to generate a predicted visual feature metric. In particular, the digital video selection system 106 can apply a neural network (e.g., the recurrent neural network with LSTM layer) to the visual feature vector 306 to generate a predicted visual feature metric based on one or more identified visual characteristics of the digital video 202, as identified using the visual feature extractor 302.

For example, as just mentioned, the visual feature predictor 304 can include a recurrent neural network trained to classify an input digital videos into classes. For instance, the visual prediction model can classify an input digital video into classes 1-5, where each class corresponds to a particular performance level (e.g., level 1 corresponds to 1% conversion rate, level 2 corresponds to 2% conversion rate, etc.). The digital video selection system 106 can apply the visual feature predictor 304 to the feature vector 306 and generate a predicted classification (e.g., level 3) as the predicted visual performance metric.

As mentioned above, the predicted visual feature metric can also include a distribution of predicted values for one or more potential viewers of the digital video 202. For example, in addition to (or in the alternative to) utilizing the predicted classification (e.g., level 3) the digital video selection system 106 can utilize a probability distribution. For instance, the visual feature predictor 304 can generate a probability distribution that can be utilized to generate a predicted classification (e.g., 10% probability of level 1, 20% probability of level 2, 55% probability of level 3, 10% probability of level 4, and 5% probability of level 5). The visual feature predictor 304 can strip away the predicted classification and utilize this probability distribution as the predicted visual performance metric.

As mentioned previously, in addition to a visual prediction model the digital video selection system 106 can also utilize a text prediction model. Indeed, FIG. 3 illustrates the text prediction model 206, which includes a textual feature extractor 314 and a textual feature predictor 316 (e.g., a textual feature classifier). As shown, the digital video selection system 106 can utilize the textual feature extractor 314 to identify text and extract a textual representation 318 associated with the digital video 202. Moreover, the digital video selection system 106 can utilize the textual feature predictor 304 to generate a predicted textual performance metric, $p_2(x)$ As just mentioned, the textual feature extractor 314 identifies text corresponding to the digital video 202 and generates a textual representation. The textual feature extractor can identify text corresponding to the digital video 202 in a variety of ways. For example, the digital video selection system 106 can identify text from metadata of a digital file of the digital video 202. In particular, metadata of the digital video 202 can include text, such topics, titles (video titles, segment titles), key words, or other text (e.g., subtitles) associated with the digital video 202. For instance, in one or more embodiments, a creator, distributor, or other entity provides specific topics, key words, or other text when providing the digital video 202 to the digital video selection system 106.

Alternatively, in one or more embodiments, the digital video selection system 106 utilizes one or more auto-tagging tools or other text identifying analysis techniques to identify text associated with the digital video 202. For example, the digital video selection system 106 can analyze content of the digital video 202 and identify any number of key words associated with audio content, visual content, metadata, or other data that makes up the digital video 202.

In addition to identifying text associated with the digital video 202, the digital video selection system 106 can additionally generate a textual representation of the digital video 202. For example, as shown in FIG. 3, the digital video selection system 106 can generate a text vector 318 including values representative of text associated with the digital video 202. For example, in one or more embodiments, the digital video selection system 106 generates a text document including text associated with the digital video 202. The digital video selection system 106 can further generate a text vector 318 in a term frequency-inverse document frequency (TF-IDF) vector space that represents the text document. The text vector 318 can include values that indicate instances of certain key words, tags, topics, or other text in addition to frequency of the text in the text document and/or a determined importance associated with the identified text.

Upon generating the textual representation (e.g., the text vector 318) of the digital video 202, the digital video selection system 106 can utilize a textual feature predictor 304 to generate or otherwise determine a predicted textual performance metric for the digital video 202. Indeed, the textual feature predictor 304 can include a multi-class text classifier (or other text predictor) that considers keywords (or other identified text) associated with the digital video represented by the text vector 318 to determine the predicted textual performance metric. In one or more embodiments, the textual feature predictor 304 includes a multi-class classifier trained using a Naïve Bayes model that assumes one or more values of a particular feature (e.g., a keyword) is conditionally independent of the value of any other feature, given a class variable. For example, the textual feature classifier may consider related terms as independently contributing to a predicted textual performance metric. While one or more embodiments described herein specifically utilize a Naïve Bayes model to determine the predicted textual performance metric, the digital video selection system 106 can similarly utilize one of a variety of probabilistic classifiers (or a neural network) to determine the predicted textual performance metric.

The digital video selection system 106 can train the textual feature predictor 304 utilizing training digital videos (e.g., training text corresponding to digital videos) and training performance data. For instance, the digital video selection system 106 can train the textual feature predictor 304 by comparing predicted performance metrics for a training text from a training digital video with the training performance data. In relation to a Naïve Bayes model, the digital video selection system 106 can adjust feature weights for independent variables within the model to more accurately predict classifications that align with the training performance data.

Similar to the visual feature predictor 304, the digital video selection system 106 can train the textual feature predictor 304 to classify digital videos into one or more classes or categories. For instance, digital video selection system 106 can train the textual feature predictor 304 to classify a digital video into one of five different classifications reflecting predicted performance of a digital video upon dissemination to a client device (e.g., category 1 reflects a first range of viewing rates, category 2 reflects a second range of viewing rates). The digital video selection system 106 can utilize these predicted classifications as a predicted textual performance metric. Moreover, as discussed above, the digital video selection system 106 can also utilize a probability distribution as the predicted textual performance metric. For example, because Naïve Bayes classifiers are probabilistic classifiers, the digital video selection system 106 can utilize a probabilistic distribution corresponding to predicted classes as the predicted textual performance metric.

As mentioned above, the digital video selection system 106 can also utilize a multi-modal combination model to combine visual performance metrics and textual performance metrics. For example, FIG. 3 illustrates the multi-modal combination model 208 generating combined performance metrics. In particular, FIG. shows the digital video selection system 106 providing predicted performance metrics from the visual prediction model 204 and text prediction model 206 as inputs to the multi-modal combination model 208. Moreover, the digital video selection system 106 generates a combined performance metric $p_c(x)$ in accordance with the following:

$$p_c(x) = \alpha_1 p_1(x) + \alpha_2 p_2(x)$$

where $p_1(x)$ refers to a predicted visual performance metric, $p_2(x)$ refers to a predicted textual performance metric, and $\alpha_1$ and $\alpha_2$ refer to weights associated with a learned importance of each of the predicted performance metrics.

As mentioned above, where the deep neural network digital video prediction model 200 includes one or more additional prediction models (e.g., an audio-based prediction model), the digital video selection system 106 can provide one or more additional predicted performance metrics as inputs to the multi-modal combination model 208. Accordingly, in one or more embodiments, the digital video selection system 106 can generate a combined performance metric $p_c(x)$ in accordance with the following:

$$p_c(x) = \Sigma_i \alpha_i p_i(x)$$

where i refers to a characteristic (e.g., visual, audio, textual) of the digital video 202, $\alpha_i$ refers to a weight for a respective characteristic of the digital video 202, and $p_i(x)$ refers to a predicted performance metric for a respective characteristic of the digital video 202.

As mentioned above, the predicted performance metrics and combined performance metric may refer to distributions of predicted values over a range of values. Accordingly, in one or more embodiments, the digital video selection system 106 utilizes the multi-modal combination model 208 to generate the combined performance metric by combining two distributions. For instance, the digital video selection system 106 combines the predicted performance metrics by applying learned weights to each of performance distribution. Additional detail with regard to training the multi-modal combination model 208 and learning the weights to apply to the respective predicted performance metrics is described in further detail below in connection with FIG. 5.

Figure 4:
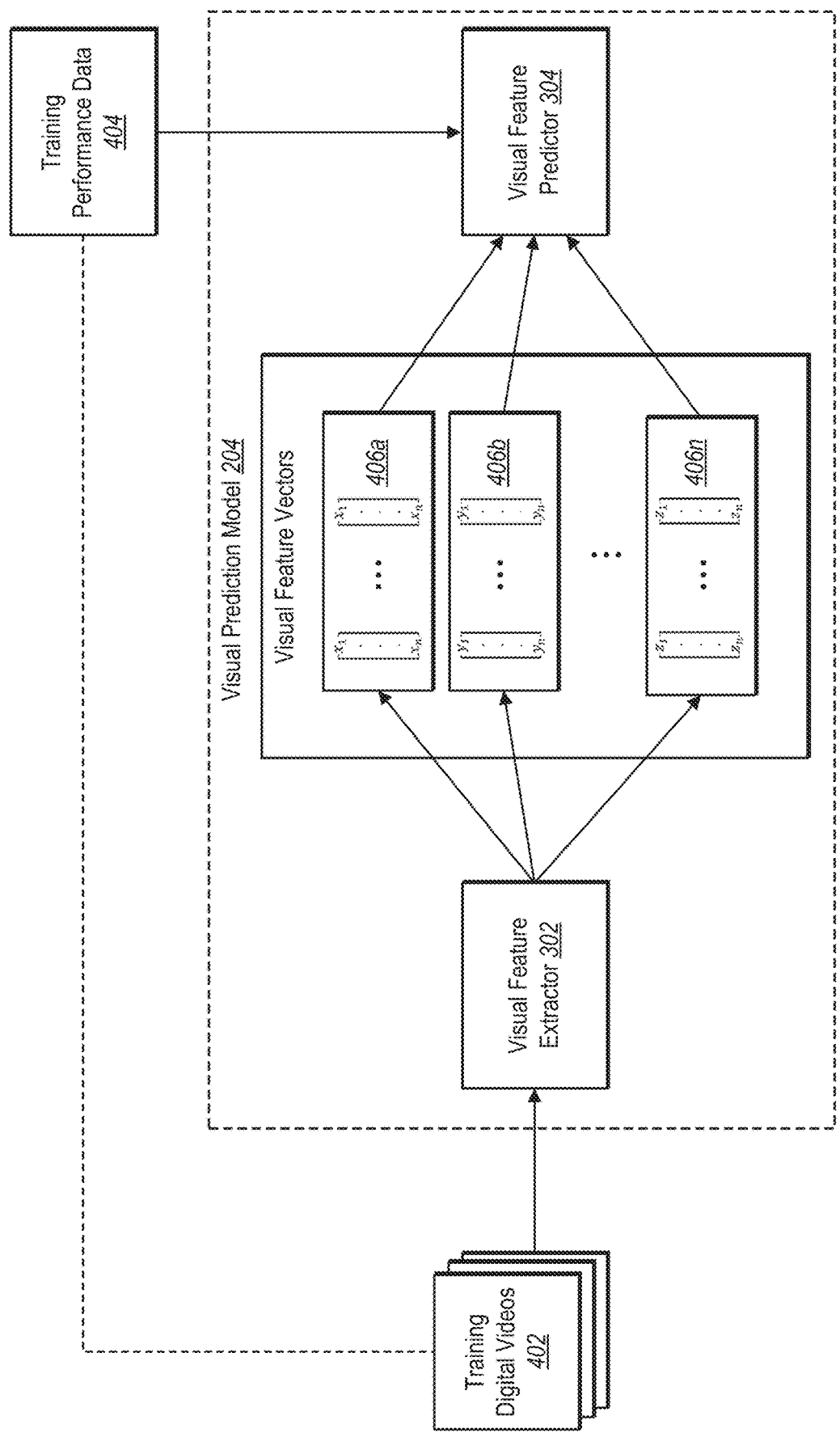
FIG. 4 illustrates training an example visual-content based visual prediction model in accordance with one or more embodiments.

Proceeding onto FIG. 4, an example framework is shown for training the visual prediction model 204 in accordance with one or more embodiments. In particular, FIG. 4 shows an example in which the digital video selection system 106 trains the visual feature predictor 304 of the visual prediction model 204 in accordance with one or more embodiments described herein. As shown in FIG. 4, the digital video selection system 106 can train the visual feature predictor 304 based on training digital videos 402 and training performance data 404 associated with the training digital videos 402.

As shown in FIG. 4, the digital video selection system 106 trains the visual feature predictor 304 based on a plurality of visual feature vectors 406a-n (or other feature representations) generated by the visual feature extractor 302. In particular, the digital video selection system 106 can utilize a visual feature extractor 302 previously trained to generate visual feature vectors 406a-n representative of each of the training digital videos 402.

For example, similar to utilizing the visual feature vector 306 described in FIG. 3, the digital video selection system 106 can extract video frames from each of the training digital videos 402 and utilize a deep learning extraction network to generate visual feature vectors representative of the extracted video frames. Thus, in one or more embodiments, the digital video selection system 106 generates the visual feature vectors 406a-n representative of extracted video frames from each of the training digital videos 402.

As illustrated in FIG. 4, the digital video selection system 106 can generate a visual feature vector including values corresponding to content detected within each of the training digital videos 402. The visual feature vectors 406a-n can include similar dimensions and features described above in connection with the visual feature vector 306 representative of the digital video 202 described in connection with FIG. 3.

The digital video selection system 106 can utilize the visual feature predictor 304 to analyze the visual feature vectors 406a-n and determine a predicted visual performance metric. The digital video selection system 106 can then utilize the training performance data 404 associated with the training digital videos 402 to train the visual feature classifier.

The digital video selection system 106 can generate, identify, or receive the training performance data. For example, the digital video selection system 106 can track user interactions by training users with the training digital videos to generate the training performance data 404. In particular, the training performance data 404 including metrics such as interactions by training users, impressions by the training users, and/or conversion rates (e.g., purchases or other tracked actions) of the training users. In one or more embodiments, the training performance data 404 comprises a ground-truth classification. For example, the training performance data 404 can include a training category that reflects performance of a training digital video (e.g., training category 1 corresponding to a conversion rate of 1%-2% for a digital video).

The digital video selection system 106 can train the visual feature predictor 304 in accordance with a number of different models. For example, in one or more embodiments, the digital video selection system 106 trains the visual feature classifier using a neural network or other deep learning framework. For instance, the digital video selection system 106 can utilize a bidirectional long short term memory (LSTM) network with a softmax output layer. In training this model, the digital video selection system 106 can compare a predicted visual performance metric from the visual feature predictor 304 with the training performance data 404 (e.g., utilizing a measure of loss). Moreover, the digital video selection system 106 can modify parameters of the visual prediction model to reduce the loss.

For example, in one or more embodiments, the digital video selection system 106 can minimize cross-entropy loss (between the predicted visual performance metric and the training performance data 404) using an Adam optimizer or other extension or variant on stochastic gradient descent algorithms used in minimizing an objective function. Furthermore, for regularization, the digital video selection system 106 can use dropout and early stopping criteria, which may be determined when validating the models or estimators utilized by the visual feature predictor 304. In one or more embodiments, the digital video selection system 106 utilizes a neural network similar to the LSTM network described in "Long Short-Term Memory" by Hochreiter and Schmidhuber, which is incorporated herein by reference in its entirety.

While not shown in FIG. 4, the digital video selection system 106 can also train one or more components of the text prediction model based on a corresponding set of training digital videos and associated training performance data. For instance, the digital video selection system 106 can extract textual features from each of a set of training digital videos (e.g., training digital videos 402 used to train one or more components of the visual prediction model 204) to generate a plurality of text vectors similar to the text vector 318 described in connection with FIG. 3. Accordingly, the digital video selection system 106 can generate a plurality of text vectors representative of identified text associated with each of the corresponding training digital videos.

In one or more embodiments, the digital video selection system 106 trains each of the visual feature predictor 304 and textual feature predictor 304 in parallel (e.g., independently) and using the same set of training digital videos 402. For example, the digital video selection system 106 can train the visual feature predictor 304 based on visual feature vectors 406a-n and further based on training performance data 404 associated with each of the training digital videos. In addition, the digital video selection system 106 can independently train the textual feature predictor 304 based on text vectors representative of identified text associated with the same set of training digital videos 402 and further based on training performance data 404 associated with the text vectors. Accordingly, similar to the visual feature predictor 304 mentioned above, the digital video selection system 106 can train the textual feature predictor 304 based on inputs including text vectors representative of text associated with the training digital videos 402 and corresponding training performance data 404.

Figure 5:
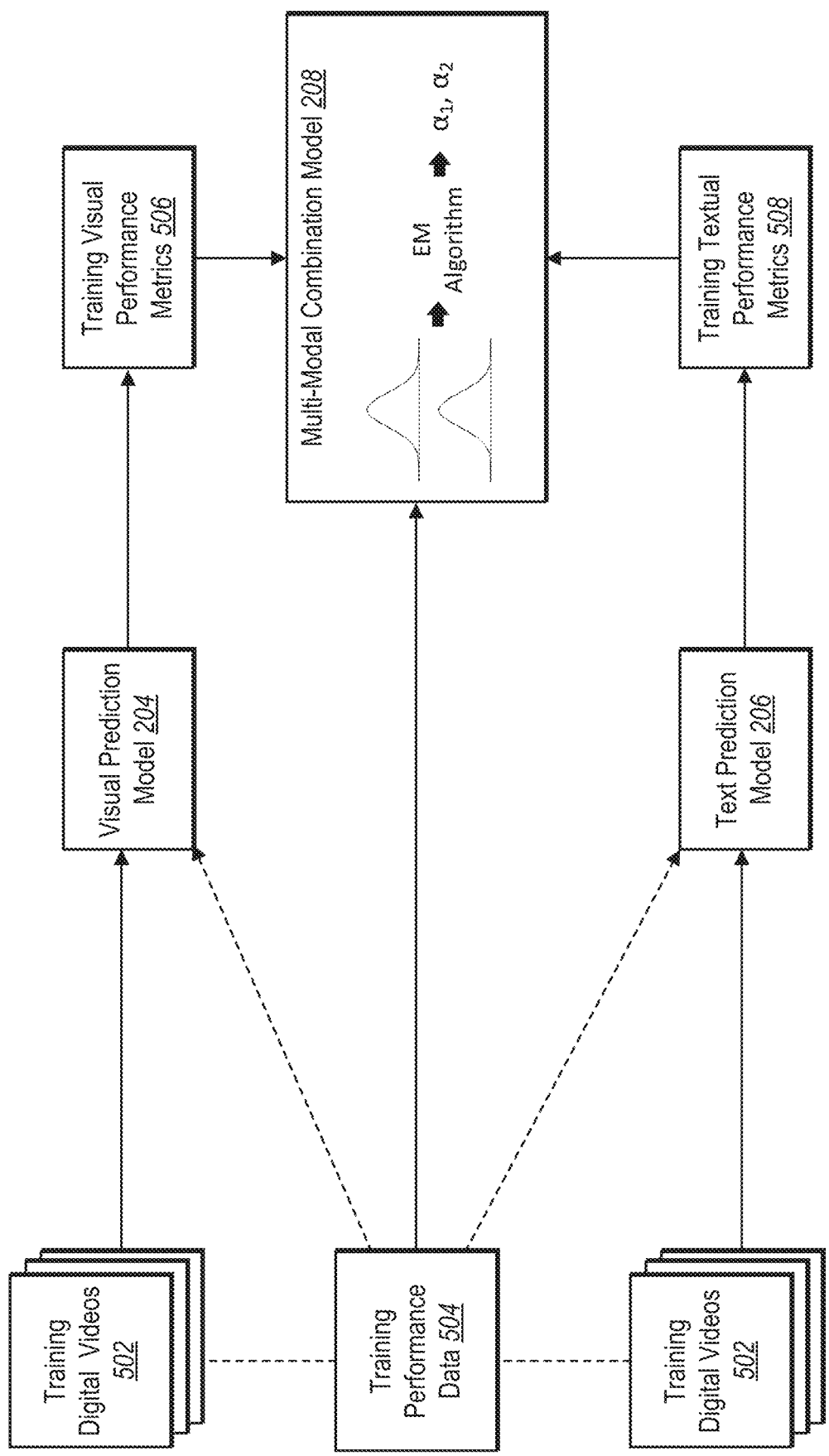
FIG. 5 illustrates training an example multi-modal combination model in accordance with one or more embodiments.

In addition to training each of the visual prediction model 204 and text prediction model 206, the digital video selection system 106 can train the multi-modal combination model 208 based on outputs of the visual prediction model 204, training digital videos, and associated training performance data. For example, FIG. 5 illustrates an example in which the digital video selection system 106 trains the multi-modal combination model 208 in accordance with one or more embodiments. In particular, FIG. 5 illustrates the digital video selection system 106 training the multi-modal combination model 208 based on training visual performance metrics 506, training textual performance metrics 508, and training performance data 404 associated with training digital videos 402.

As shown in FIG. 5, the digital video selection system 106 can utilize the visual prediction model 204 to generate training visual performance metrics 506 for a set of training digital videos 502. In particular, the digital video selection system 106 can utilize the visual prediction model 204 to generate the training visual performance metrics 506 based on visual content (e.g., visual feature vectors or other visual representation of the visual content) identified within the training digital videos 502. Similarly, the digital video selection system 106 can utilize the text prediction model 206 to generate training textual performance metrics 508 for the set of training digital videos 502. In particular, the digital video selection system 106 can utilize the text prediction model 206 to generate the training textual performance metrics 508 based on identified text (e.g., text vectors or other textual representation of the identified text) associated with the training digital videos 502.

In relation to FIG. 5, the training visual performance metrics 506 are generated utilizing the (previously trained) visual prediction model 204. In one or more embodiments, the training digital videos 502 and associated training performance data 504 can be the same training digital videos 402 and associated training performance data 404 used in training the visual prediction model 204 and/or text prediction model 206. Alternatively, in some embodiments, the digital video selection system 106 (or other computing system) utilizes a first set of training data (e.g., training digital videos 402 and training performance data 404) to train the visual prediction model 204 and/or the text prediction model 206 while utilizing a different set of training data (e.g., training digital videos 502 and training performance data 504) for training the multi-modal combination model 208.

As show in FIG. 5, upon generating the training visual performance metrics 506 and training textual performance metrics, the digital video selection system 106 can train the multi-modal combination model 208 based on the training performance data 504 and each of the training performance metrics 506, 508. In one or more embodiments, the digital video selection system 106 trains the multi-modal combination model 208 based on one or more additional training performance metrics. For example, where an audio prediction model or other type of prediction model has been trained to determine performance metrics based on a different characteristic of a digital video, the digital video selection system 106 can train the multi-modal combination further based on any a training audio performance metric or other training performance metric generated using the one or more additional prediction models.

The digital video selection system 106 can train the multi-modal combination model 208 by comparing the training visual performance metrics 506, the training textual performance metrics 508 and the training performance data 504. For instance, in relation to FIG. 5, the digital video selection system 106 trains the multi-modal combination model 208 by performing a convex combination of the training visual performance metrics 506 and training textual performance metrics 508 to fit a distribution of performance metrics from the training performance data 504. In one or more embodiments, the digital video selection system 106 trains the multi-modal combination model 208 to determine mixture weights (e.g., $\alpha_1$, $\alpha_2$) that, when applied to the respective training performance metric 508, maximize a fit between combination performance metrics and the training performance data 504.

To illustrate, in one or more embodiments, the digital video selection system 106 determines the mixture weights by employing an expectation-maximization (EM) algorithm. In particular, the digital video selection system 106 iteratively estimates parameters that maximize a fit between the training performance data 504 in combination with the training visual performance metrics 506 and training textual performance metrics 508. To illustrate, the digital video selection system 106 can utilize an expectation-maximization (EM) algorithm that iteratively alternates between performing an expectation step (e.g., estimating a function for the expectation of the log-likelihood using a current estimate), and a maximization step (e.g., computing parameters that maximize the expected log-likelihood). In this manner, the digital video selection system 106 can estimate mixture weights, $\alpha_1$, $\alpha_2$, that maximize the similarity between combined performance metrics and the training performance data 504.

As mentioned above, the digital video selection system 106 can train the visual prediction model 204, the text prediction model 206, and/or the multi-modal combination model in parallel (individually) or jointly. In some embodiments, the digital video selection system 106 trains the models in parallel, thereby improving scalability of the training framework. In particular, by training (and/or applying) the prediction models 502, 504 in parallel, the digital video selection system 106 facilitates generating an accurate combined performance metric using a less complex and scalable framework that may not be possible if the visual prediction model 204 were dependent on the textual prediction model 206 (and vice versa).

As indicated by the foregoing discussion, the digital visual selection system 106 can generate a combined visual-textual performance metric for selecting and disseminating digital visual content. Accordingly, the foregoing acts and algorithms described in relation to FIGS. 2-3 can comprise corresponding structure for a step for utilizing a visual prediction model, a text prediction model, and a trained multi-modal combination model to generate a combined visual-textual performance metric of the digital video. As an example, the digital video selection system 106 can perform acts of utilizing a neural network of the visual feature predictor 304 to generate a predicted visual performance metric including a first distribution of scores, utilizing the textual feature predictor 304 to generate a predicted textual performance metric including a second distribution of scores, and further utilizing the multi-modal combination model 208 to generate a combined performance metric including a weighted combination of the first and second distribution of scores.

As discussed, the digital video selection system 106 can improve accuracy relative to other systems. Researchers have performed experiments to establish the improved accuracy of the digital video selection system 106. In particular, researchers used a dataset containing around 3.5 thousand video ads labeled with effectiveness score from 1 to 5. Each video ad was no longer than 2 minutes and at least of 5 second duration. The average duration was 49 seconds (with most around 30 seconds). Each video ad was labelled by at least five Amazon Mechanical Turkers. The effectiveness score 1 was for least effective and 5 was for most effective digital videos. Researchers then considered the majority vote of effectiveness for each video ad as ground truth and trained all the models considering this value as target.

Figure 6:
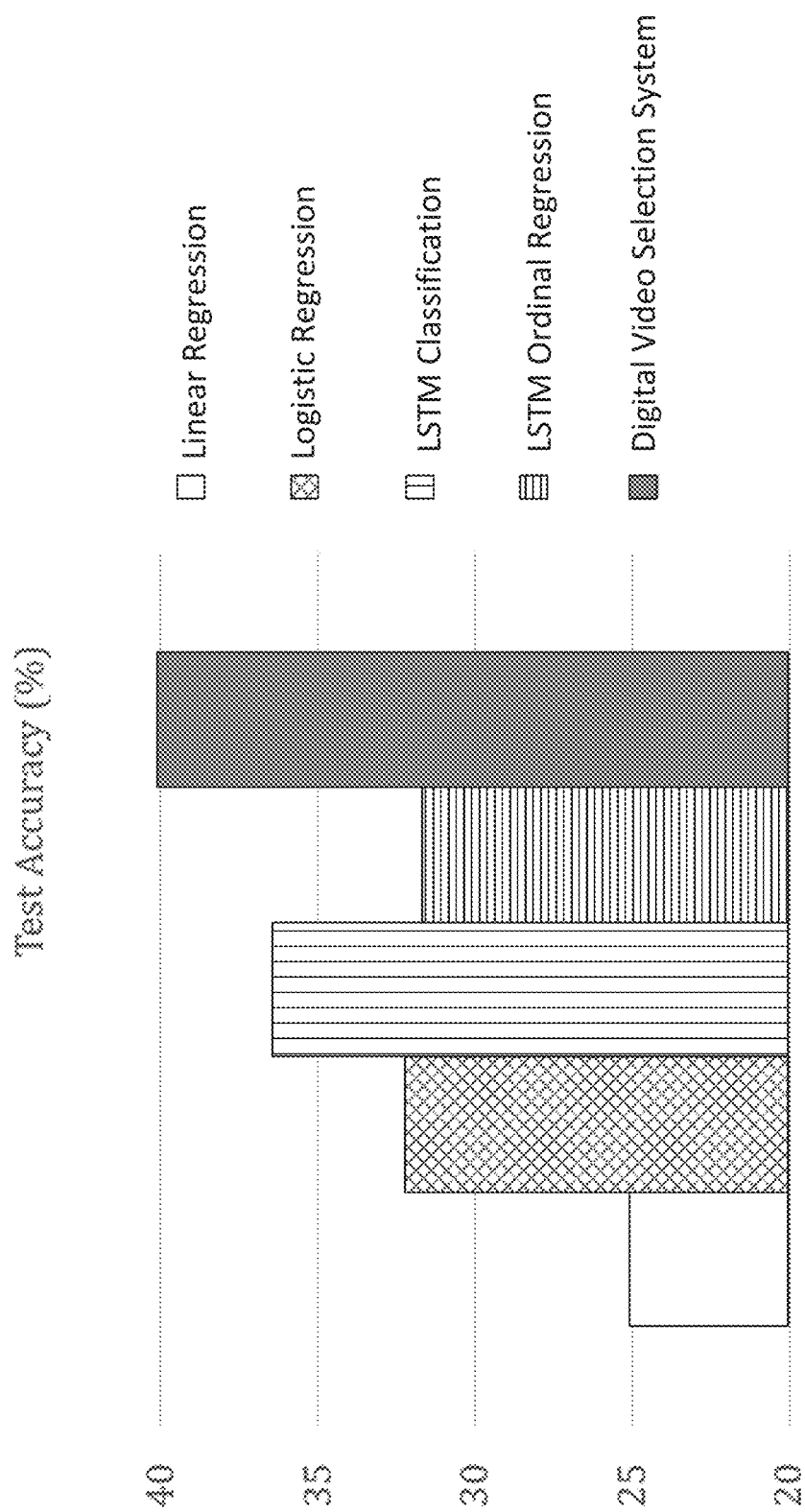
FIG. 6 illustrates results of research in relation to an example digital video selection system in accordance with one or more embodiments.

Researchers compared the digital video selection system 106 with other approaches, including, linear regression, logistic regression, LSTM based classification, and LSTM based ordinal regression. As shown in FIG. 6, when compared to these other approaches, the digital video selection system 106 produces more accurate results.

Figure 7:
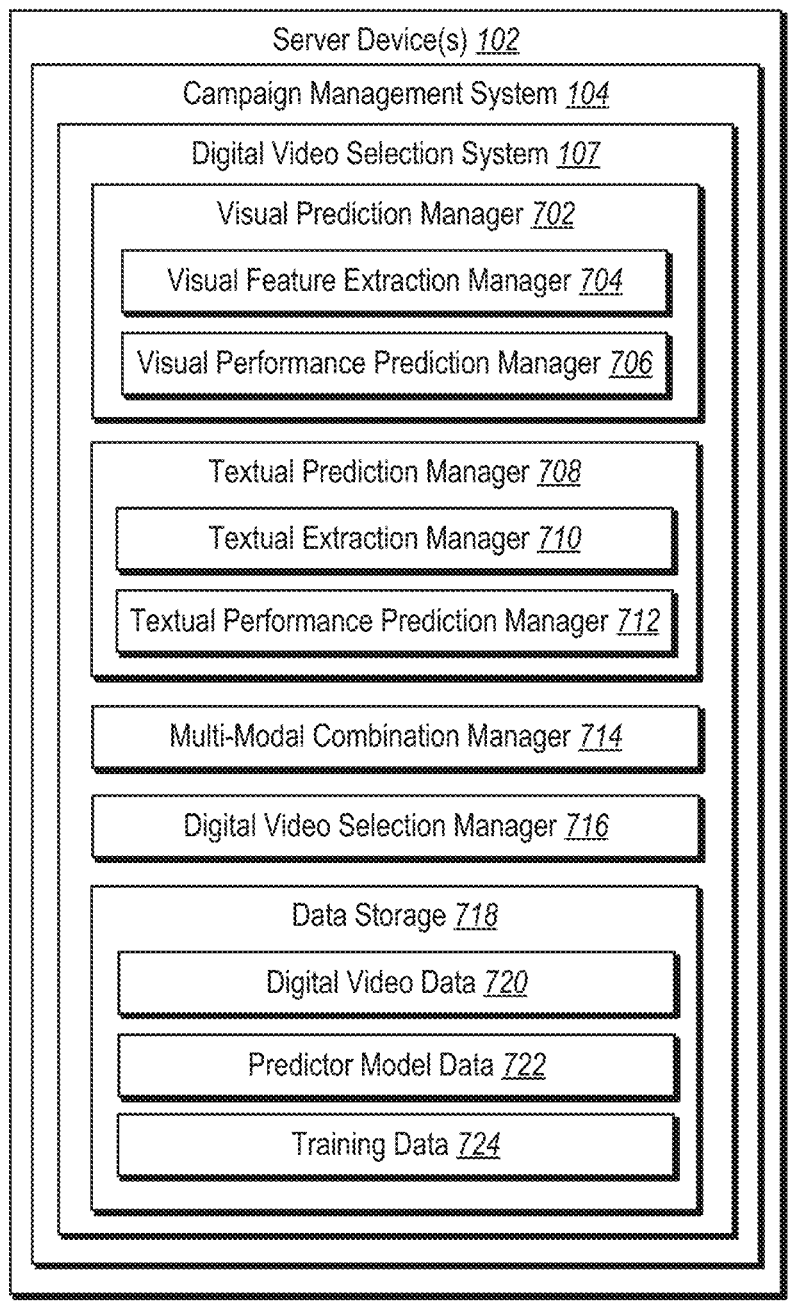
FIG. 7 illustrates a schematic diagram of an example digital video selection system in accordance with one or more embodiments.

Turning now to FIG. 7, additional detail will be provided regarding components and capabilities of an example architecture for the digital video selection system 106. As mentioned above, the digital video selection system 106 can be implemented by a variety of computing devices including the server device(s) 102, client device 108, or a combination of the two. In particular, FIG. 7 illustrates one implementation of the digital video selection system 106 implemented within a campaign management system 104 on the server device(s) 102 and having similar features and functionality associated with one or more embodiments described above. For example, the digital video selection system 106 can provide features and functionality associated with generating a combined performance metric for a digital video based on a predicted visual performance metric and a predicted textual performance metric. The digital video selection system 106 can further select one or more digital videos for dissemination based on the combined performance metric.

As shown in FIG. 7, the digital video selection system 106 includes a visual prediction manager 702 which includes a visual feature extraction manager 704 and a visual performance prediction manager 706. The digital video selection system 106 further includes a textual prediction manager 708 which includes a textual extraction manager 710 and a textual performance prediction manager 712. The digital video selection system 106 further includes a multi-modal combination manager 714 and a digital video selection manager 716. The digital video selection system 106 also includes a data storage 718 which can include digital video data 720, predictor model data 722, and training data 724.

In one or more embodiments, each of the components of the digital video selection system 106 are in communication with one another using any suitable communication technologies. Additionally, the components of the digital video selection system 106 can be in communication with one or more other devices including the client device 108 and the server device(s) 102, as illustrated in FIG. 1. It will be recognized that although the components of the digital video selection system 106 are shown to be separate in FIG. 7, any of the subcomponents may be combined into fewer components, such as into a single component, or divided into more components as may serve a particular implementation. Furthermore, although the components of FIG. 7 are described in connection with the digital video selection system 106, at least some of the components for performing operations in conjunction with the digital video selection system 106 described herein may be implemented on other devices within the environment.

The components of the digital video selection system 106 can include software, hardware, or both. For example, the components of the digital video selection system 106 can include one or more instructions stored on a computer-readable storage medium and executable by processors of one or more computing devices (e.g., the server device(s)). When executed by the one or more processors, the computer-executable instructions of the digital video selection system 106 can cause the server device(s) 102 to perform the methods described herein. Alternatively, the components of the digital video selection system 106 can comprise hardware, such as a special purpose processing device to perform a certain function or group of functions. Additionally or alternatively, the components of the digital video selection system 106 can include a combination of computer-executable instructions and hardware.

Furthermore, the components of the digital video selection system 106 performing the functions described herein with respect to the digital video selection system 106 may, for example, be implemented as part of a stand-alone application, as a module of an application, as a plug-in for applications including content management applications, as a library function or functions that may be called by other applications, and/or as a cloud-computing model. Thus, the components of the digital video selection system 106 may be implemented as part of a stand-alone application on a personal computing device or a mobile device. Alternatively or additionally, the components of the digital video selection system 106 may be implemented in any application that allows product and customer management, including, but not limited to, applications in ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE", "ADOBE ANALYTICS CLOUD", "ADOBE ANALYTICS", "ADOBE AUDIENCE MANAGER", "ADOBE CAMPAIGN", "ADOBE EXPERIENCE MANAGER", and "ADOBE TARGET" are registered trademarks of Adobe Systems Incorporated in the United States and/or other countries.

As shown in FIG. 7, the digital video selection system 106 includes a visual prediction manager 702 which includes components for training and/or utilizing the visual prediction model 204 in accordance with one or more embodiments described above. For example, the visual prediction manager 702 can include a visual feature extraction manager 704 that identifies one or more visual features from a digital video. For instance, in accordance with one or more embodiments described herein, the visual feature extraction manager 704 can extract a number of video frames from a digital video and apply a deep learning extraction network (e.g., including a convolutional neural network) to identify one or more visual features or characteristics of the digital video.

By applying the deep learning extraction network to the digital video, the visual feature extraction manager 704 can identify visual features of the digital video and generate a visual representation of the digital video including values representative of the identified visual features. For example, the visual feature extraction manager 704 can generate a visual feature vector including a dimensional vector (e.g., a 2048 dimensional vector) including values corresponding to a visual classification or detected features within the visual content of the digital video. As another example, the visual feature extraction manager 704 can generate a feature matrix similarly including values representative of detected features from the visual content of the digital video.

As further shown in FIG. 7, the visual prediction manager 702 includes a visual performance prediction manager 706 that determines a predicted performance associated with distributing a digital video based on visual content of the digital video. In particular, the visual performance prediction manager 706 determines a predicted performance based on a visual feature representation (e.g., a visual feature vector) representative of identified visual features from the digital video. In one or more embodiments, the visual performance prediction manager 706 generates a predicted visual performance metric including a distribution of scores corresponding to a predicted performance of distributing the digital video based on an analysis of the identified visual features.

As described above, the visual performance prediction manager 706 can generate the predicted visual performance in a number of ways. In one or more embodiments, the visual performance prediction manager 706 generates the predicted visual performance by applying a trained visual feature classifier to the visual representation of the digital video. For instance, the visual performance prediction manager 706 can apply a trained neural network such as a bidirectional long short term memory (LSTM) network to generate the predicted visual performance metric.

As further shown in FIG. 7, the digital video selection system 106 includes a textual prediction manager 708 including components for training and/or utilizing the textual extraction manager 710 and the textual performance prediction manager 712. For example, the textual extraction manager 710 can identify text associated with a digital video. In one or more embodiments, the textual extraction manager 710 identifies text from metadata embedded within a digital video file and provided by a content distributor or creator of the digital video. Alternatively, in one or more embodiments, the textual extraction manager 710 identifies terms using one or more auto-tagging tools or other text identification method.

In addition to identifying text associated with the digital video, the textual extraction manager 710 can additionally generate a textual representation for the digital video. For example, the textual extraction manager 710 can generate a text document including identified text and generate a textual vector representation of the text in a term frequency-inverse document frequency (TF-IDF) vector space. The resulting text vector can include values indicating identified keywords and relative importance with respect to the digital video.

As mentioned above, the textual prediction manager 708 further includes a textual performance prediction manager 712 that determines a predicted performance associated with distributing a digital video based on identified text associated with the digital video. In particular, the textual performance prediction manager 712 determines a predicted performance based on a textual representation (e.g., a textual vector) representative of identified text from the digital video file. In one or more embodiments, the textual performance prediction manager 712 generates a predicted visual performance metric including a distribution of scores corresponding to a predicted performance of distributing the digital video based on an analysis of the identified text.

As shown in FIG. 7, the digital video selection system 106 further includes a multi-modal combination manager 714 that generates or otherwise determines a combined performance metric for a digital video. In particular, the multi-modal combination manager 714 can combine a predicted visual performance metric with a predicted textual performance metric to generate a combined performance metric representative of a predicted outcome of distributing the digital video to one or more client devices. In particular, the multi-modal combination manager 714 can determine a performance metric including, by way of example, a predicted rate of interaction by one or more client devices, a predicted impression of the digital video on viewers, and/or a predicted conversion rate by one or more users for a product associated with the digital video.

The multi-modal combination manager 714 can generate the combined performance metric by performing a combination of a first distribution of scores (e.g., the predicted visual performance metric) and a second distribution of scores (e.g., the predicted textual performance metric). In one or more embodiments, the multi-modal combination manager 714 learns mixture weights to apply to respective predicted performance metrics and applies a first mixture weight to the predicted visual performance metric and a second mixture weight to the predicted textual performance metric. In one or more embodiments, the multi-modal combination manager 714 determines the mixture weights by employing an expectation-maximization (EM) algorithm. Additionally, while the multi-modal combination manager 714 may learn any number of weights corresponding to a number of prediction performance metrics (e.g., visual, audio, textual), in one or more embodiments, a sum of the mixture weights equals one to ensure proportionate weighting of the prediction performance metrics.

As further shown in FIG. 7, the digital video selection system 106 includes a digital video selection manager 716 for identifying one or more digital videos for distribution. In particular, the digital video selection manager 716 can select a digital video for distribution based on a corresponding combined performance metric. For example, where a combined performance metric exceeds a threshold value (e.g., a threshold score, a threshold distribution of scores, etc.), the digital video selection manager 716 may identify the digital video for distribution to one or more client devices.

In one or more embodiments, the digital video selection manager 716 causes the server device(s) 102 to transmit one or more selected digital videos to one or more client devices (e.g., client device 108). Alternatively, in one or more embodiments, the digital video selection manager 716 provides the combined performance metric or indication of performance associated with distributing the digital video to a third-party system (e.g., an ad server, content publisher).

As illustrated in FIG. 7, the digital video selection system 106 includes a data storage 718 including digital video data 720. The digital video data 720 can include any data from a digital video file corresponding to a digital video. For example, the digital video data 720 may include visual content, audio content, text content, or any data from the metadata of a digital video file. The digital video data 720 can further include information included with a digital video, for example, an associated data file. As described above, the digital video selection system 106 can utilize different portions of the digital video data 720 to determine predicted performance metrics and a combined performance metric associated with a predicted performance of distributing the digital video to one or more client devices.

As further shown, the data storage 718 includes predictor model data 722 includes information associated with various models or classifiers for determining one or more metrics described herein. For example, the predictor model data 722 can include one or more trained algorithms, models, or classifiers that the digital video selection system 106 can apply to one or more digital videos to generate or otherwise determine predicted visual performance metrics, predicted textual performance metrics, and/or combined performance metrics in accordance with one or more embodiments described herein.

In addition, the data storage 718 can include training data 724 including any information associated with training one or more classifiers or models for generating the predicted performance metrics and/or the combined performance metrics. For example, the training data 724 may include training digital videos and corresponding training performance data including a history of interactions with digital videos and tracked actions by test users in response to viewing one or more training digital videos.

Figure 8:
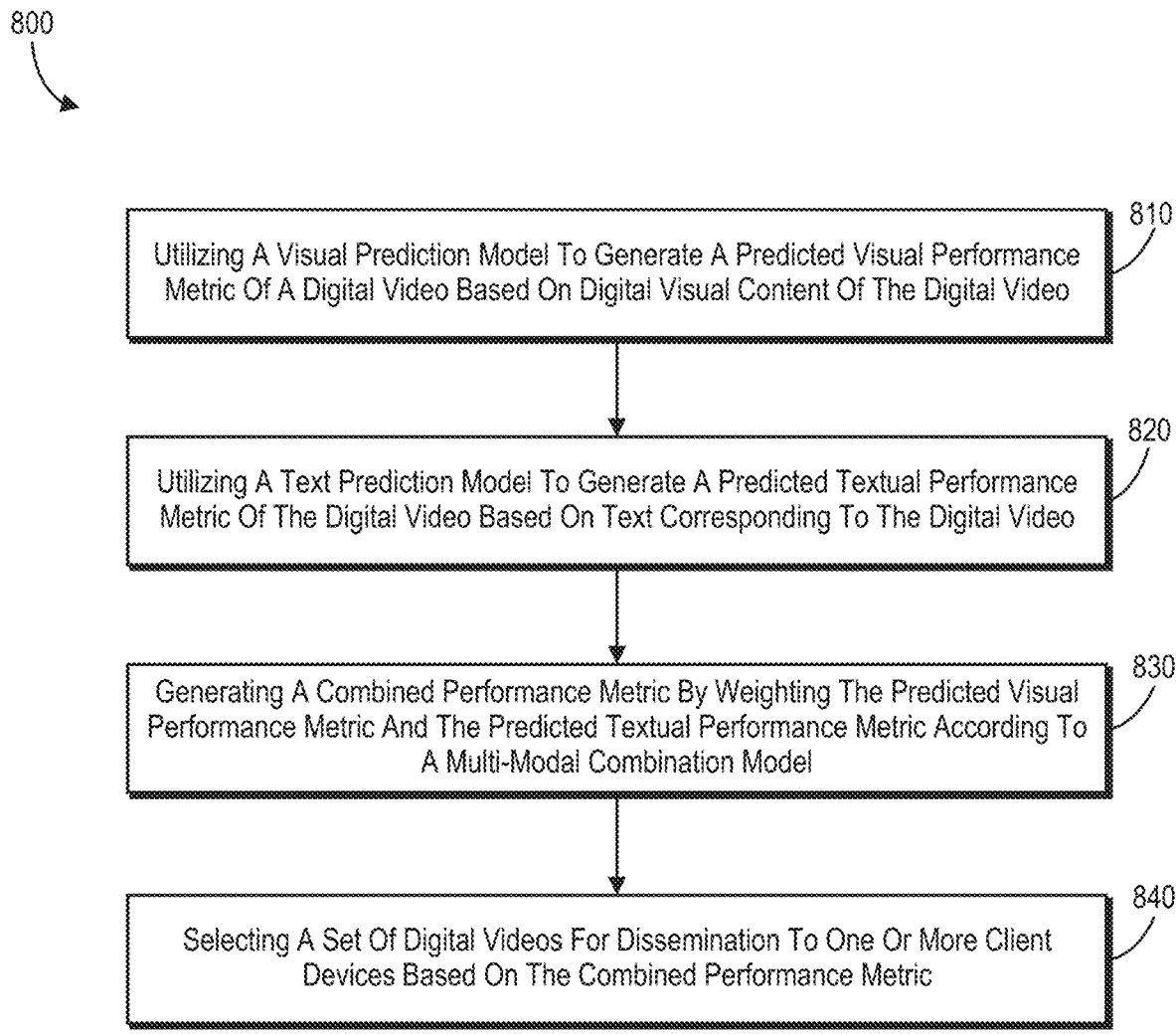
FIG. 8 illustrates a flow diagram of an example series of acts identifying a digital video for dissemination in accordance with one or more embodiments.

Turning now to FIG. 8, this figure illustrates a flowchart including a series of acts 800 for determining a combined prediction performance metric associated with predicted responses of viewers in response to providing the digital video to one or more client devices. While FIG. 8 illustrates acts according to one or more embodiments, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

For example, the series of acts 800 includes an act 810 of utilizing a visual prediction model 204 to generate a predicted visual performance metric of a digital video (e.g., digital video 202) based on digital visual content of the digital video. For instance, in one or more embodiments, the act 810 includes utilizing a neural network to generate a predicted visual performance metric of a digital video based on digital visual content of the digital video. In one or more embodiments, the series of acts 800 includes generating a visual feature representation of the digital video based on digital visual content of the digital video. In addition, in one or more embodiments, the act 810 includes utilizing a neural network trained to determine visual performance metrics based on visual content of training digital videos and associated training performance data to generate a predicted visual performance metric based on the visual feature representation of the digital video.

In addition, the series of acts 800 includes an act 820 of utilizing a text prediction model 206 to generate a predicted textual performance metric of the digital video based on text corresponding to the digital video. For instance, in one or more embodiments, the act 820 includes utilizing a text prediction model 206 (e.g., a multi-class text classifier) to generate a predicted textual performance metric of the digital video based on text corresponding to the digital video. In one or more embodiments, the series of acts 800 includes generating a textual feature representation of the digital video based on text corresponding to the digital video. In addition, in one or more embodiments, the act 810 includes utilizing a text prediction model 206 trained to determine textual performance metrics based on text of the training digital videos and the associated training performance data to generate a predicted textual performance metric from the textual feature representation.

As further shown in FIG. 8, the series of acts 800 includes an act 830 of generating a combined performance metric by weighting the predicted visual performance metric and the predicted textual performance metric according to a multi-modal combination model 208. For example, in one or more embodiments, the act 830 includes generating a combined performance metric by weighting the predicted visual performance metric and the predicted textual performance metric according to a multi-modal combination model 208 trained based on a set of training digital videos, training performance data, training textual performance metrics, and training visual performance metrics.

In one or more embodiments, utilizing the neural network to generate a predicted visual performance metric includes utilizing the neural network to generate a first distribution of scores representative of predicted responses to providing the digital video to the one or more client devices. In addition, in one or more embodiments, utilizing the text prediction model to generate the predicted textual performance metric includes utilizing the text prediction model to generate a second distribution of scores representative of predicted responses to providing the digital video to the one or more client devices. Moreover, in one or more embodiments, generating the combined performance metric includes performing a combination of the first distribution of scores and the second distribution of scores to generate a combined distribution of scores representative of predicted responses to providing the digital video to the one or more client devices.

In one or more embodiments, the series of acts 800 includes generating the combined performance metric by weighting the predicted visual performance metric and the predicted textual performance metric according to a multi-modal combination model. For example, the series of acts 800 can include applying an expectation-maximization (EM) algorithm to determine weights based on the training performance data, the training textual performance metrics, and the training visual performance metrics. The series of acts 800 can further include applying the determined weights to the predicted visual performance metric and the predicted textual performance metric to determine the combined performance metric. For example, the series of acts 800 can include applying a first weight to the predicted visual performance metric and applying a second weight to the predicted textual performance metric.

In one or more embodiments, the series of acts 800 includes utilizing a convolutional neural network to generate a vector representation of the digital visual content. Further, in one or more embodiments, the series of acts 800 includes analyzing the vector representation of the digital visual content utilizing a bidirectional long short term memory (LSTM) network to generate the predicted visual performance metric. Further, in one or more embodiments, the series of acts 800 includes identifying text corresponding to the digital video by one or more of extracting metadata of the digital video or mining keywords based on an analysis of the digital video.

In addition, in one or more embodiments, the series of acts 800 includes generating a textual representation of the text corresponding to the digital video. In one or more embodiments, the series of acts 800 additionally includes utilizing the text prediction model by applying the text prediction model to the textual representation of the text corresponding to the digital video to determine the predicted textual performance metric. In one or more embodiments, the series of acts 800 further includes generating the textual representation of the text corresponding to the digital video by generating a textual vector representation of the text in a term frequency-inverse document frequency (TFIDF) vector space. In addition, in one or more embodiments, the neural network, the text prediction model, and the multi-modal combination model are trained using the set of training digital videos and the training performance data.

In one or more embodiments, the series of acts 800 includes training the visual prediction model (e.g., including the neural network) and/or textual prediction model. In one or more embodiments, the series of acts 800 includes receiving a trained visual prediction model and/or textual prediction model. In one or more embodiments, the neural network is trained independently from and in parallel with the text prediction model. In addition, each of the neural network, text prediction model, and/or the multi-modal combination model are trained using the set of training digital videos and the training performance data.

In addition, as mentioned above, the combined visual-textual performance metric can include one or more of a number of different metrics or values. For example, in one or more embodiments, the combined performance metric includes one or more of a predicted rate of interaction by one or more client devices of one or more users with the digital video, a predicted impression by the one or more users with respect to the digital video, or a predicted conversion rate by the one or more users for a product associated with the digital video.

As further shown in FIG. 8, the series of acts 800 includes an act 840 of selecting a set of digital videos for dissemination to one or more client devices (e.g., client device 108) based on the combined performance metric. For example, in one or more embodiments, the act 840 includes selecting a set of digital videos for dissemination to one or more client devices based on the combined performance metric of the digital video.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
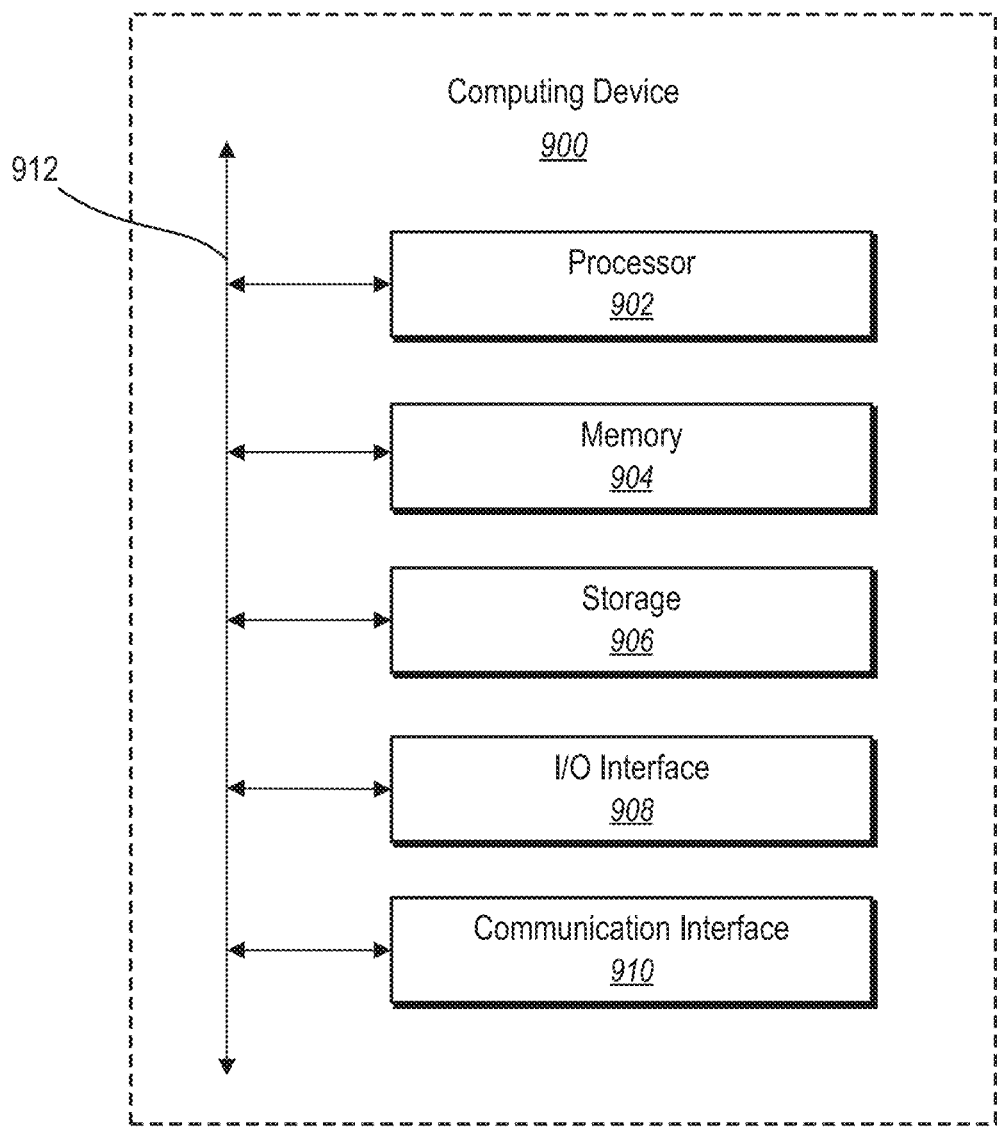
FIG. 9 illustrates a block diagram of an example computing device in accordance with one or more embodiments.

FIG. 9 illustrates a block diagram of exemplary computing device 900 that may be configured to perform one or more of the processes described above. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions for digitizing real-world objects, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions related to object digitizing processes (e.g., digital scans, digital models).

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method for efficiently and accurately selecting digital videos based on digital video and digital text features comprising:
   utilizing a neural network to generate a predicted visual performance metric of a digital video based on digital visual content of the digital video;
   utilizing a text prediction model to generate a predicted textual performance metric of the digital video based on text corresponding to the digital video;
   determining mixture weights for the predicted visual performance metric and the predicted textual performance metric utilizing a multi-modal combination model by applying an expectation-maximization algorithm to a set of training digital videos, training performance data, training textual performance metrics, and training visual performance metrics;
   generating a combined performance metric by applying the mixture weights to the predicted visual performance metric and the predicted textual performance metric; and
   selecting a set of digital videos for dissemination to one or more client devices based on the combined performance metric of the digital video.

2. The method of claim 1, wherein utilizing the neural network to generate the predicted visual performance metric comprises utilizing the neural network to generate a first probability distribution of scores representative of predicted responses to providing the digital video to the one or more client devices; and
   wherein utilizing the text prediction model to generate the predicted textual performance metric comprises utilizing the text prediction model to generate a second probability distribution of scores representative of predicted responses to providing the digital video to the one or more client devices.

3. The method of claim 2, wherein generating the combined performance metric comprises applying the mixture weights to the first probability distribution of scores and the second probability distribution of scores to generate a combined probability distribution of scores representative of predicted responses to providing the digital video to the one or more client devices.

4. The method of claim 1, further comprising generating a textual representation of the text corresponding to the digital video, the textual representation comprising a textual vector representation in a term frequency inverse document frequency (TF-IDF) vector space.

5. A system comprising:
at least one processor;
a non-transitory computer readable medium storing instructions thereon that, when executed by at least one processor, cause the system to:
utilize a neural network to generate a predicted visual performance metric of a digital video based on digital visual content of the digital video;
utilize a text prediction model to generate a predicted textual performance metric of the digital video based on text corresponding to the digital video;
determine mixture weights for the predicted visual performance metric and the predicted textual performance metric utilizing a multi-modal combination model by applying an expectation-maximization algorithm to a set of training digital videos, training performance data, training textual performance metrics, and training visual performance metrics;
generate a combined performance metric by applying the mixture weights to the predicted visual performance metric and the predicted textual performance metric; and
select a set of digital videos for dissemination to one or more client devices based on the combined performance metric of the digital video.

6. The system of claim 5, further comprising instructions that, when executed by the at least one processor, cause the system to:
utilize the neural network to generate the predicted visual performance metric by utilizing the neural network to generate a first probability distribution of scores representative of predicted responses to providing the digital video to the one or more client devices; and
utilize the text prediction model to generate the predicted textual performance metric by utilizing the text prediction model to generate a second probability distribution of scores representative of predicted responses to providing the digital video to the one or more client devices.

7. The system of claim 6, further comprising instructions that, when executed by the at least one processor, cause the system to generate the combined performance metric by applying the mixture weights to the first probability distribution of scores and the second probability distribution of scores to generate a combined probability distribution of scores representative of predicted responses to providing the digital video to the one or more client devices.

8. The system of claim 5, wherein the training performance data comprises at least one of: a training user interaction, a training user impression, or a training user conversion rate.

9. The system of claim 5, further comprising instructions that, when executed by the at least one processor, cause the system to utilize the neural network to generate a predicted visual performance metric by:
utilizing a convolutional neural network to generate a vector representation of the digital visual content; and
analyzing the vector representation of the digital visual content utilizing a bidirectional long short term memory (LSTM) network to generate the predicted visual performance metric.

10. The system of claim 5, further comprising instruction that, when executed by the at least one processor, cause the system to:
generate a textual representation of the text corresponding to the digital video; and
utilize the text prediction model by applying the text prediction model to the textual representation of the text corresponding to the digital video to determine the predicted textual performance metric.

11. The system of claim 10, further comprising instructions that, when executed by the at least one processor, cause the system to:
generate the textual representation of the text corresponding to the digital video by generating a textual vector representation of the text in a term frequency-inverse document frequency (TF-IDF) vector space; and
wherein utilizing the text prediction model comprises applying a multi-class classifier trained by a Naive Bayes model to determine the predicted textual performance metric of the digital video.

12. The system of claim 5,
wherein the neural network is trained independently from and in parallel with the text prediction model; and
wherein each of the neural network, the text prediction model, and the multi-modal combination model are trained using the set of training digital videos and the training performance data.

13. A non-transitory computer-readable medium comprising instructions thereon that, when executed by at least one processor, cause a computer system to:
generate a visual feature representation of a digital video based on digital visual content of the digital video;
utilize a neural network trained to determine visual performance metrics based on visual content of training digital videos and associated training performance data to generate a predicted visual performance metric based on the visual feature representation of the digital video;
generate a textual feature representation of the digital video based on text corresponding to the digital video;
utilize a text prediction model trained to determine textual performance metrics based on text of the training digital videos and the associated training performance data to generate a predicted textual performance metric from the textual feature representation;
determine mixture weights for the predicted visual performance metric and the predicted textual performance metric utilizing a multi-modal combination model by applying an expectation-maximization algorithm to a set of training digital videos, training performance data, training textual performance metrics, and training visual performance metrics;
generate a combined performance metric by applying the mixture weights to the predicted visual performance metric and the predicted textual performance metric; and
select a set of digital videos for dissemination to one or more client devices based on the combined performance metric of the digital video.

14. The non-transitory computer-readable medium of claim 13, further comprising instructions that, when executed by the at least one processor, cause the computer system to:
utilize the neural network to generate a predicted visual performance metric by utilizing the neural network to generate a first probability distribution of scores representative of predicted responses to providing the digital video to the one or more client devices; and utilize the text prediction model to generate the predicted textual performance metric by utilizing the text prediction model to generate a second probability distribution of scores representative of predicted responses to providing the digital video to the one or more client devices; and generate the combined performance metric by applying the mixture weights to the first probability distribution of scores and the second probability distribution of scores to generate a combined distribution of scores representative of predicted responses to providing the digital video to the one or more client devices.

15. The non-transitory computer-readable medium of claim 13, further comprising instructions that, when executed by the at least one processor, cause the computer system to generate the visual feature representation of the digital video by:

identifying a plurality of video frames from the digital video; and applying a convolutional neural network trained to generate a visual feature vector representation to the plurality of video frames.

16. The non-transitory computer-readable medium of claim 13, further comprising instructions that, when executed by the at least one processor, cause the computer system to identify the text corresponding to the digital video by performing one or more of:

extracting metadata of the digital video; or mining keywords based on an analysis of the digital video.

17. The non-transitory computer-readable medium of claim 13, further comprising instructions that, when executed by the at least one processor, cause the computer system to determine the combined performance metric for the digital video by:

applying a first mixture weight to the predicted visual performance metric; and applying a second mixture weight to the predicted textual performance metric.

18. The non-transitory computer-readable medium of claim 17, further comprising instructions that, when executed by the at least one processor, causes the computer system to determine a combined performance metric for the digital video by combining a weighted predicted visual performance metric and a weighted predicted textual performance metric.

19. The non-transitory computer-readable medium of claim 13, wherein the neural network is trained independently from and in parallel with the text prediction model; and wherein each of the neural network and the text prediction model are trained using the training digital videos and the training performance data.

20. The non-transitory computer-readable medium of claim 13, wherein the predicted visual performance metric and the predicted textual performance metric of the digital video each comprise one or more of:

a predicted rate of interaction by one or more client devices of one or more users with the digital video; or a predicted conversion rate by the one or more users for a product associated with the digital video.

* * * * *